US009405126B1

(12) United States Patent
Margolin

(10) Patent No.: US 9,405,126 B1
(45) Date of Patent: *Aug. 2, 2016

(54) EYE LEVEL VIEWFINDER AND THREE DIMENSIONAL VIRTUAL REALITY VIEWING DEVICE AND METHOD

(71) Applicant: George Margolin, Newport Beach, CA (US)

(72) Inventor: George Margolin, Newport Beach, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/507,766

(22) Filed: Oct. 6, 2014

Related U.S. Application Data

(63) Continuation-in-part of application No. 12/814,436, filed on Jun. 11, 2010, now Pat. No. 8,493,507, and a continuation-in-part of application No. 13/844,308, filed on Mar. 15, 2013, now Pat. No. 8,878,988.

(51) Int. Cl.
*G02B 27/22* (2006.01)
*G02B 27/02* (2006.01)

(52) U.S. Cl.
CPC .......... *G02B 27/2257* (2013.01); *G02B 27/027* (2013.01); *G02B 27/028* (2013.01)

(58) Field of Classification Search
CPC ............. G02B 27/2257; G02B 27/027; G02B 27/028; G02B 27/2228; G02B 27/22
See application file for complete search history.

(56) References Cited

U.S. PATENT DOCUMENTS

| | | | | |
|---|---|---|---|---|
| 2,500,058 A * | 3/1950 | Brundage | ............. | G03B 17/04 193/33 |
| 4,576,459 A | 3/1986 | Miura et al. | | |
| 4,865,420 A * | 9/1989 | Schmidt | ................ | G02B 5/005 348/834 |
| 4,991,935 A * | 2/1991 | Sakurai | ................ | G02B 25/002 248/917 |
| 5,069,529 A * | 12/1991 | Takahashi | ............... | H04N 5/65 348/834 |
| 5,218,474 A | 6/1993 | Kirschner | | |
| 5,988,823 A | 11/1999 | Wong | | |
| 6,144,418 A * | 11/2000 | Kappel | ................ | G02B 27/027 348/834 |
| 6,144,419 A | 11/2000 | Schmidt | | |
| 6,419,367 B1 * | 7/2002 | Dion | .................... | H04N 5/2251 348/834 |
| 6,453,125 B2 * | 9/2002 | Shono | .................. | H04N 5/2251 348/333.08 |
| 6,542,698 B2 * | 4/2003 | Izawa | ................. | H04N 5/23293 348/E5.025 |
| 7,034,877 B2 * | 4/2006 | Schmidt | ............... | H04N 5/2251 348/333.01 |
| 7,196,742 B2 * | 3/2007 | Skjellerup | ............ | H04N 5/2251 348/834 |
| 7,336,896 B2 * | 2/2008 | Jutamulia | .............. | G03B 13/02 348/333.08 |
| 7,386,229 B2 | 6/2008 | Schmidt et al. | | |
| 7,486,887 B2 * | 2/2009 | Tian | ....................... | G03B 17/06 348/373 |
| 8,493,507 B2 | 7/2013 | Margolin | | |

(Continued)

OTHER PUBLICATIONS http://www.bhphotovideo.com/c/buy/LCD-Hoods/ci/6247/N/ 4294544846, Oct. 23, 2012.

(Continued)

*Primary Examiner* — Nicholas Giles
(74) *Attorney, Agent, or Firm* — Lawrence S. Cohen

(57) ABSTRACT

A device that allows viewing of 3D and virtual reality that is displayed on a portable device such as a cell phone for example an iPhone or any such type known as a smartphone. The device has vertical and horizontal panels that are hinged together to fold flat and to unfold into a box shape. One end is an attachment frame that allows attaching of the display source device so that its screen can be seen through the open box from the other end. On the other end is a lens frame on which are a pair of spaced apart lens for viewing separately of each eye thereby allowing 3 D viewing. The device can be equipped with a sterol separator wall to prevent vision confusion. All the parts are hinged together so as to allow the entire device to fold into a generally flattened package.

21 Claims, 32 Drawing Sheets

(56) References Cited

U.S. PATENT DOCUMENTS

| | | | |
|---|---|---|---|
| 8,878,988 B1* | 11/2014 | Margolin | G03B 11/046 348/333.01 |
| 2001/0019662 A1* | 9/2001 | Shono | G03B 17/18 396/287 |
| 2002/0097997 A1* | 7/2002 | Izawa | H04N 5/823293 396/287 |
| 2009/0046141 A1* | 2/2009 | Nojiri | A63F 13/02 348/53 |

OTHER PUBLICATIONS http://www.bhphotovideo.com/c/product/687699-REG/Hoodman_HEXKP_EX1_Kit_Pro.html, Oct. 23, 2012.
http://www.hoodmanusa.com/prodinfo.asp?number=HD%2D300+VIDEO, Feb. 27, 2013.
http://www.hoodmanusa.com/prodinfo.asp?number=H%2D200, Feb. 27, 2013.

* cited by examiner

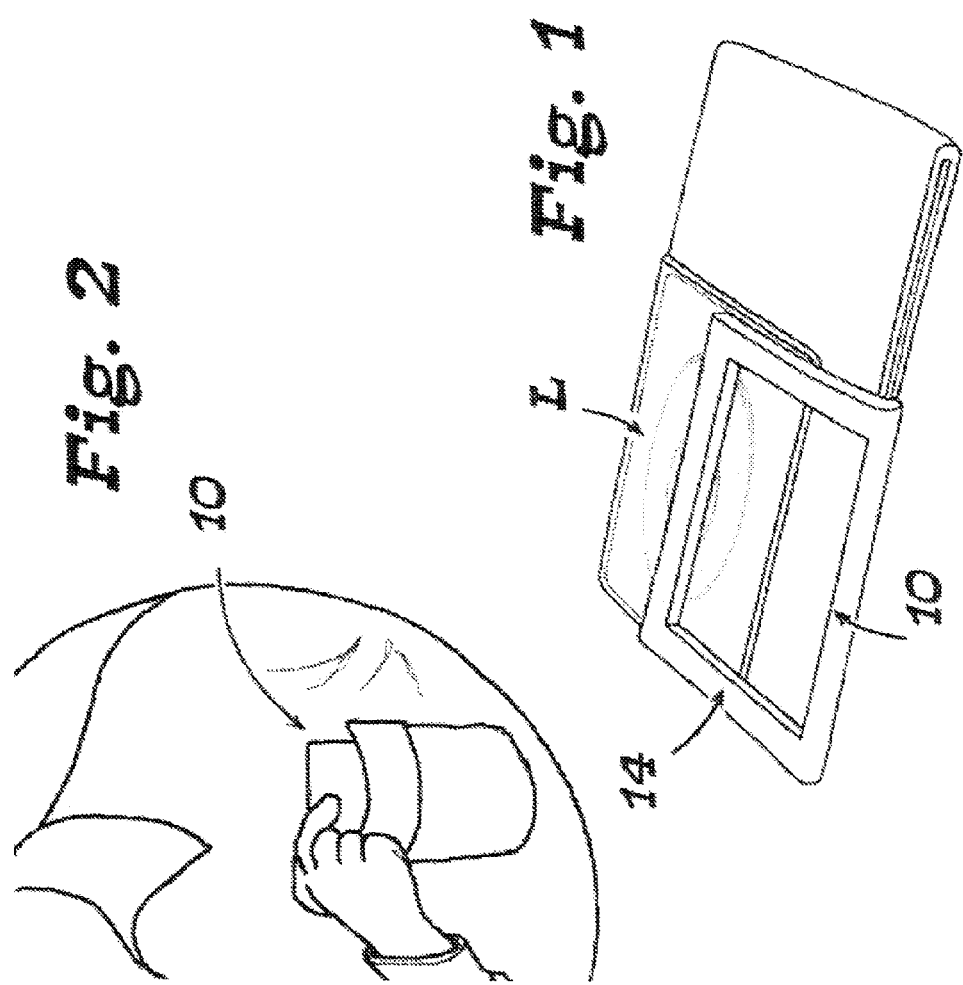

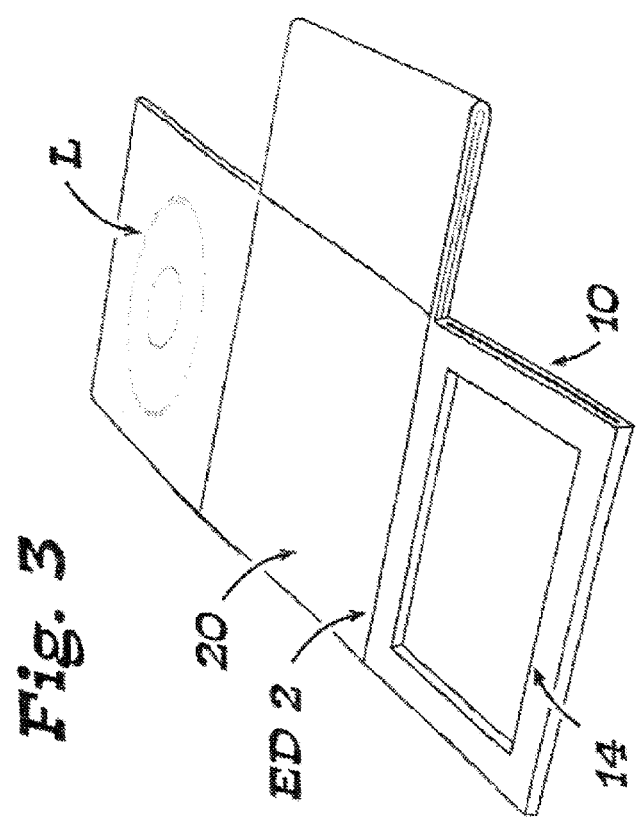

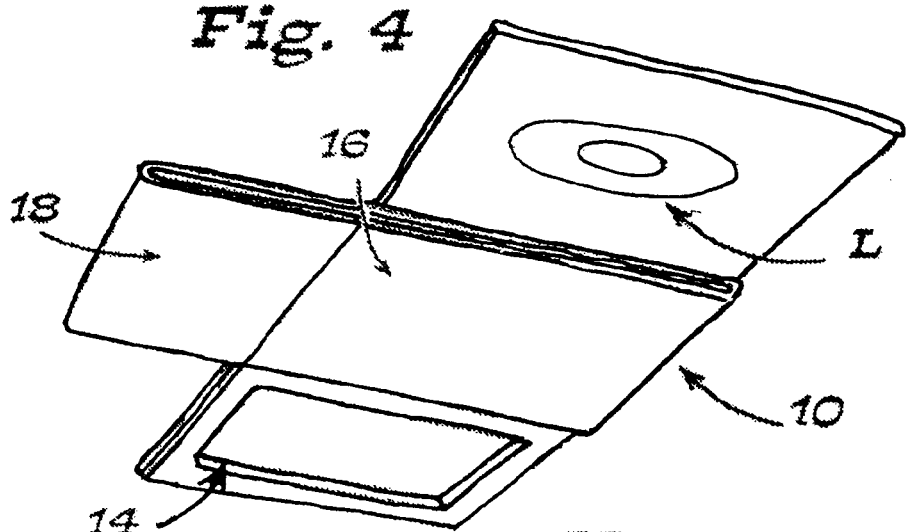
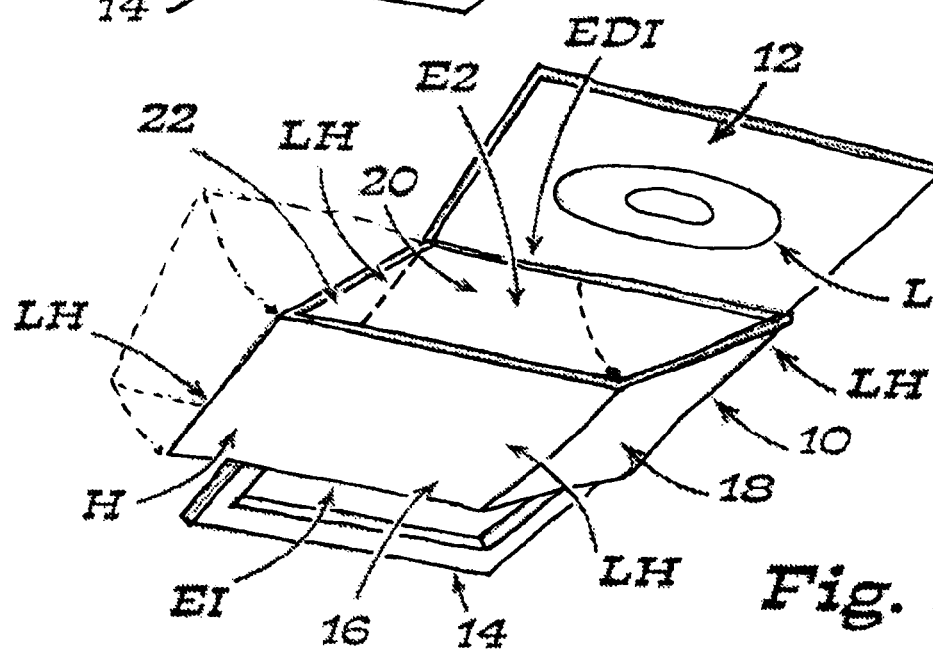

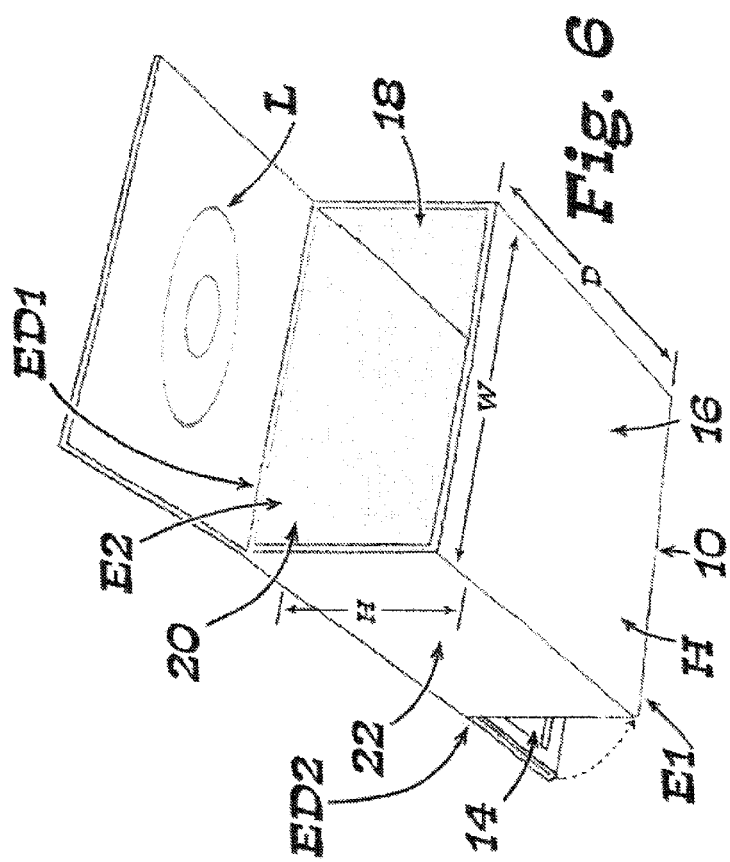

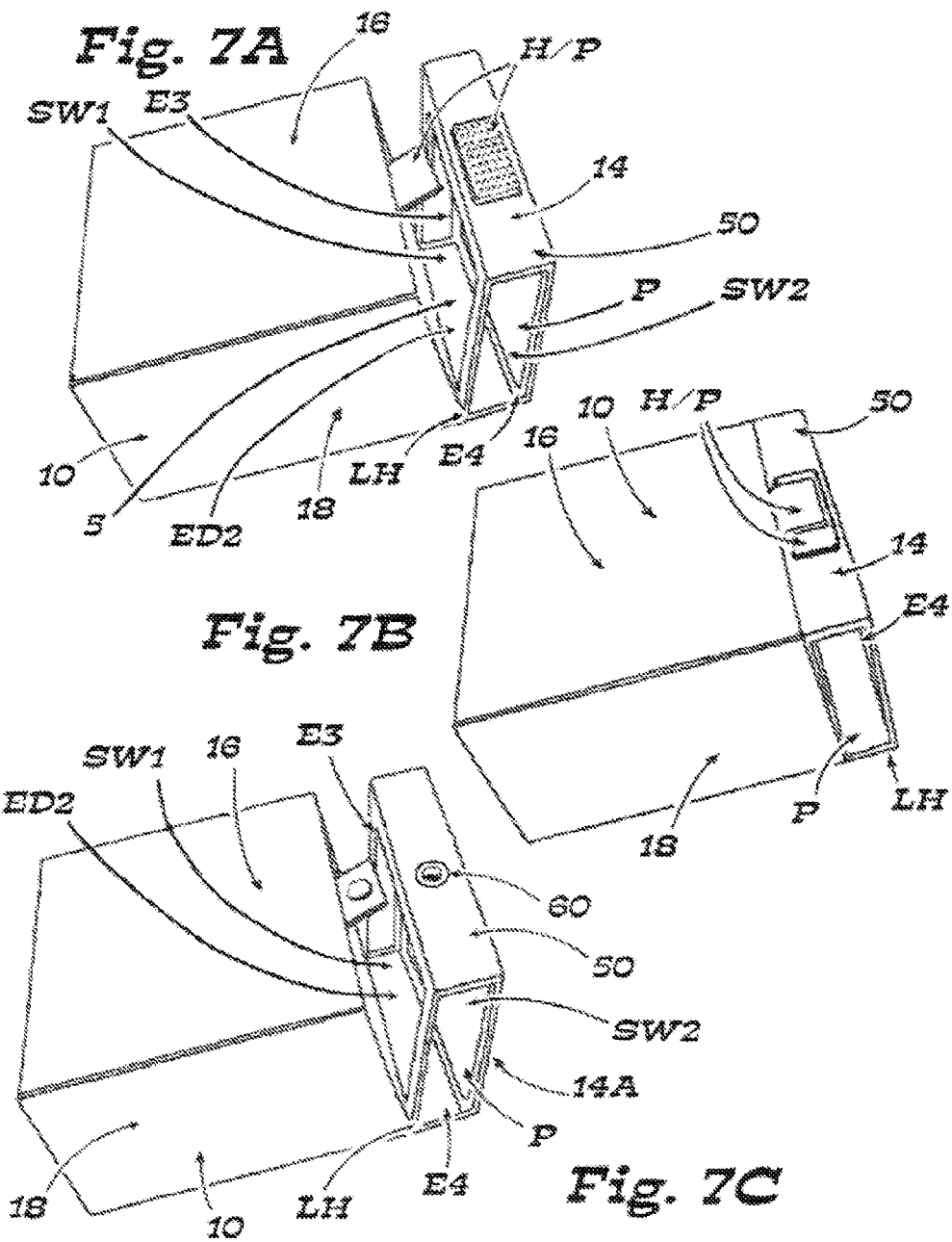

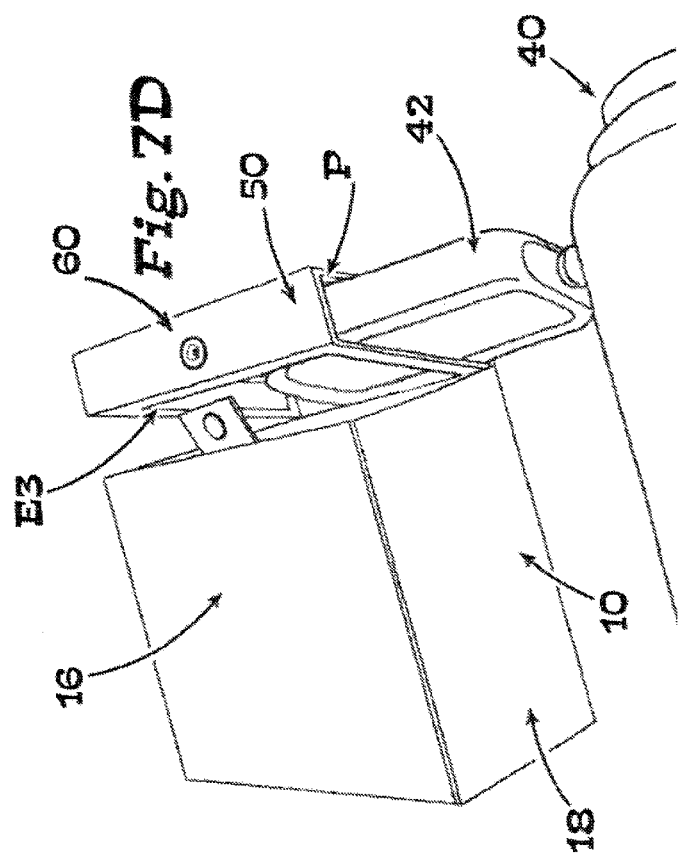

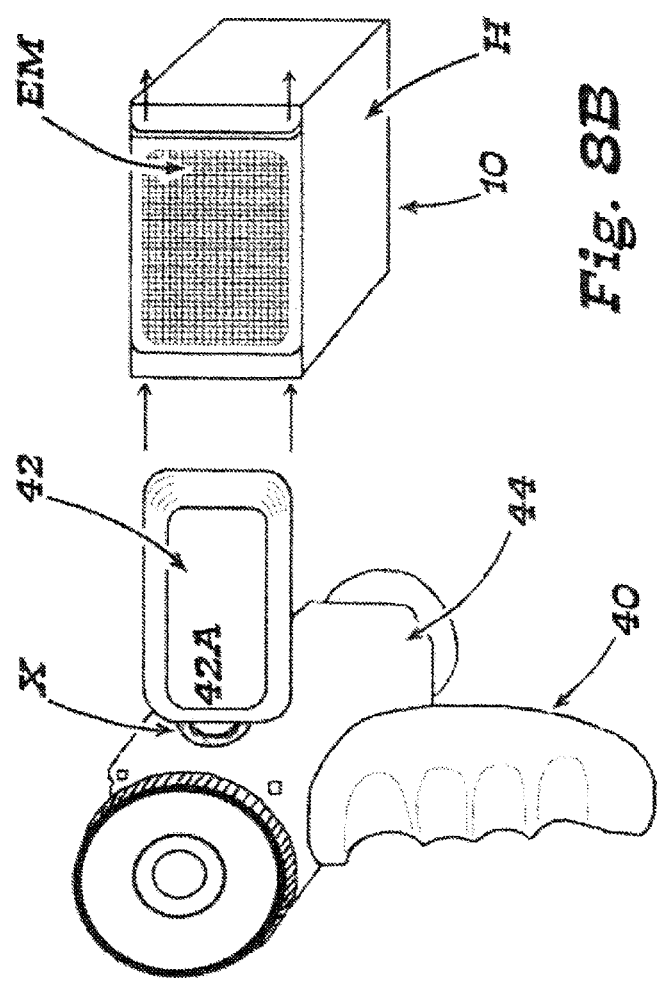

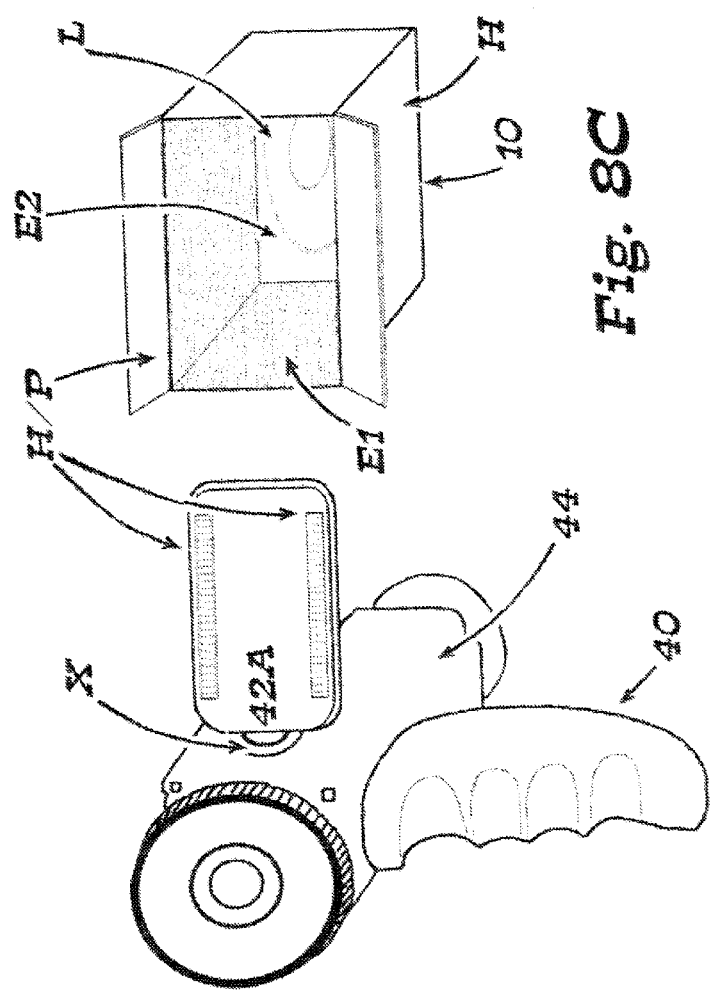

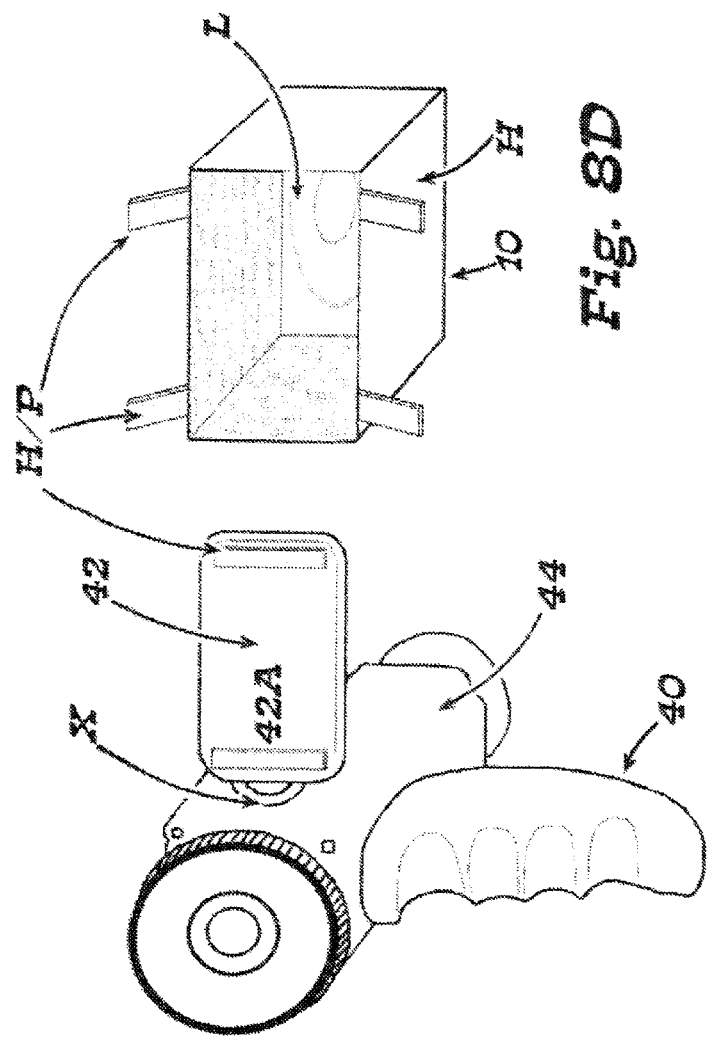

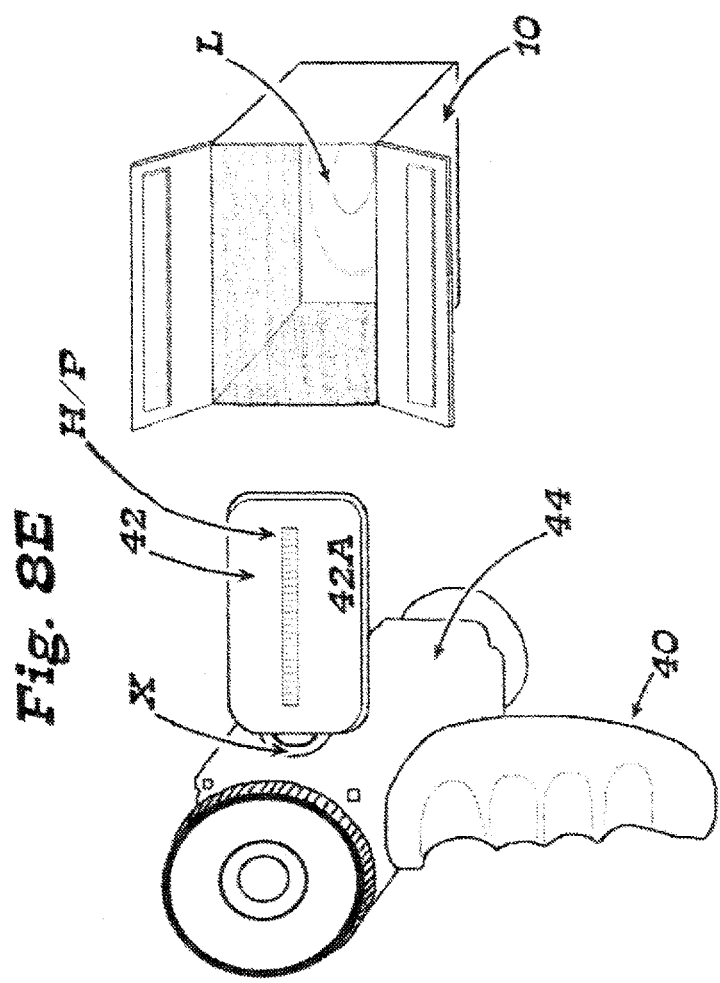

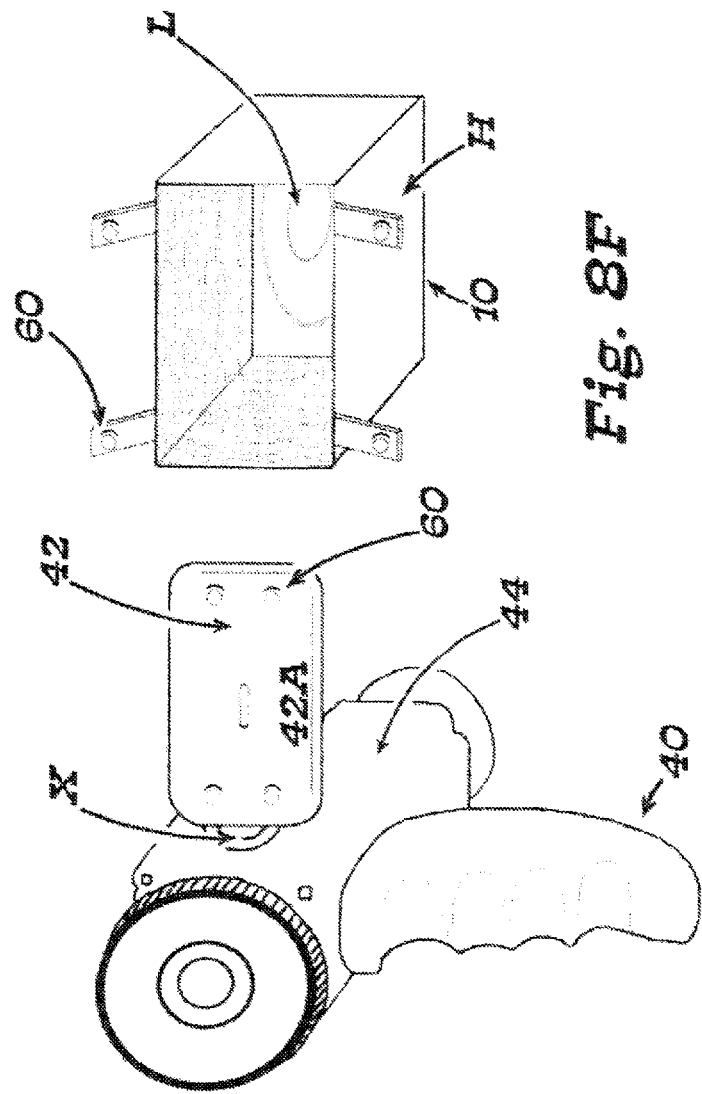

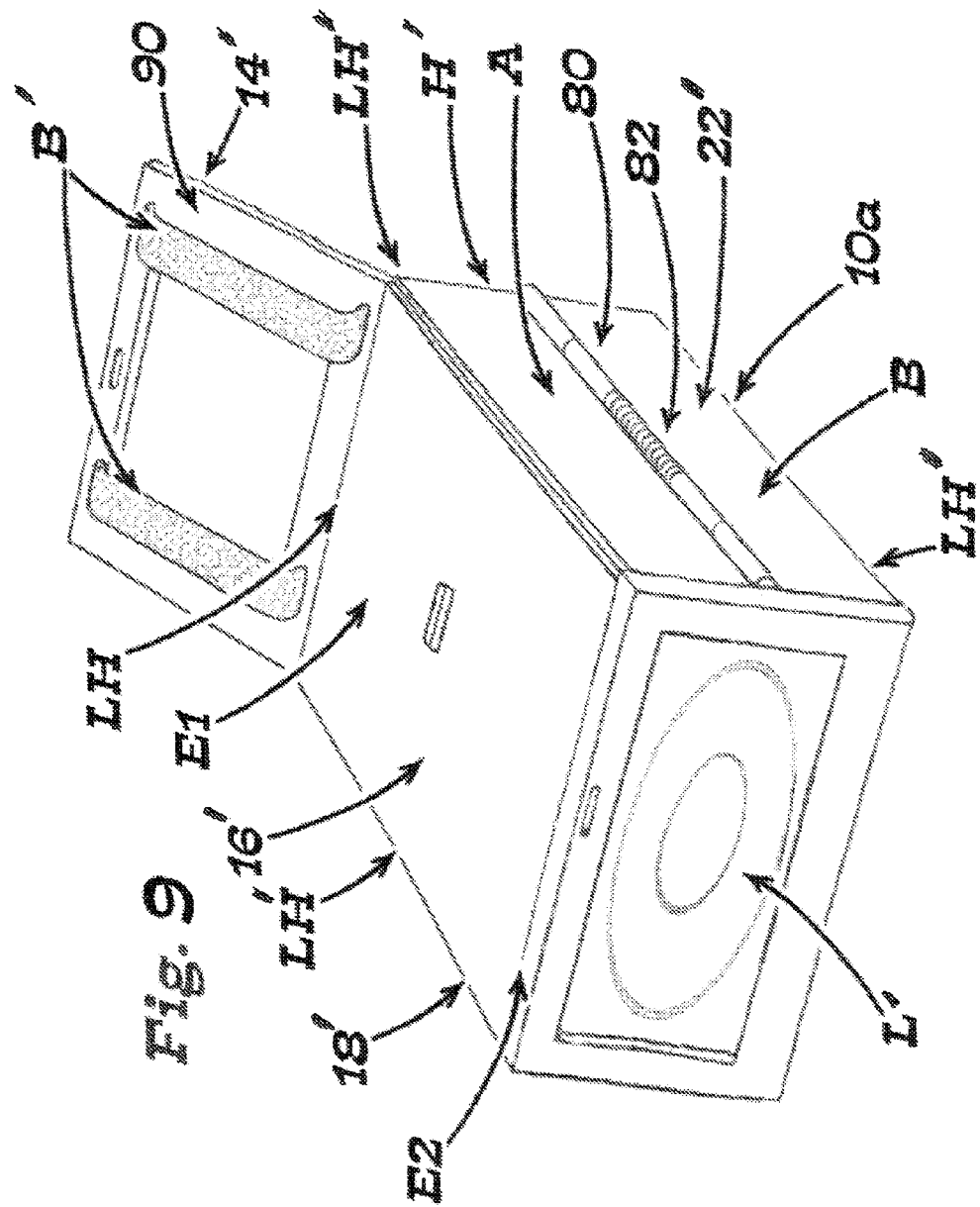

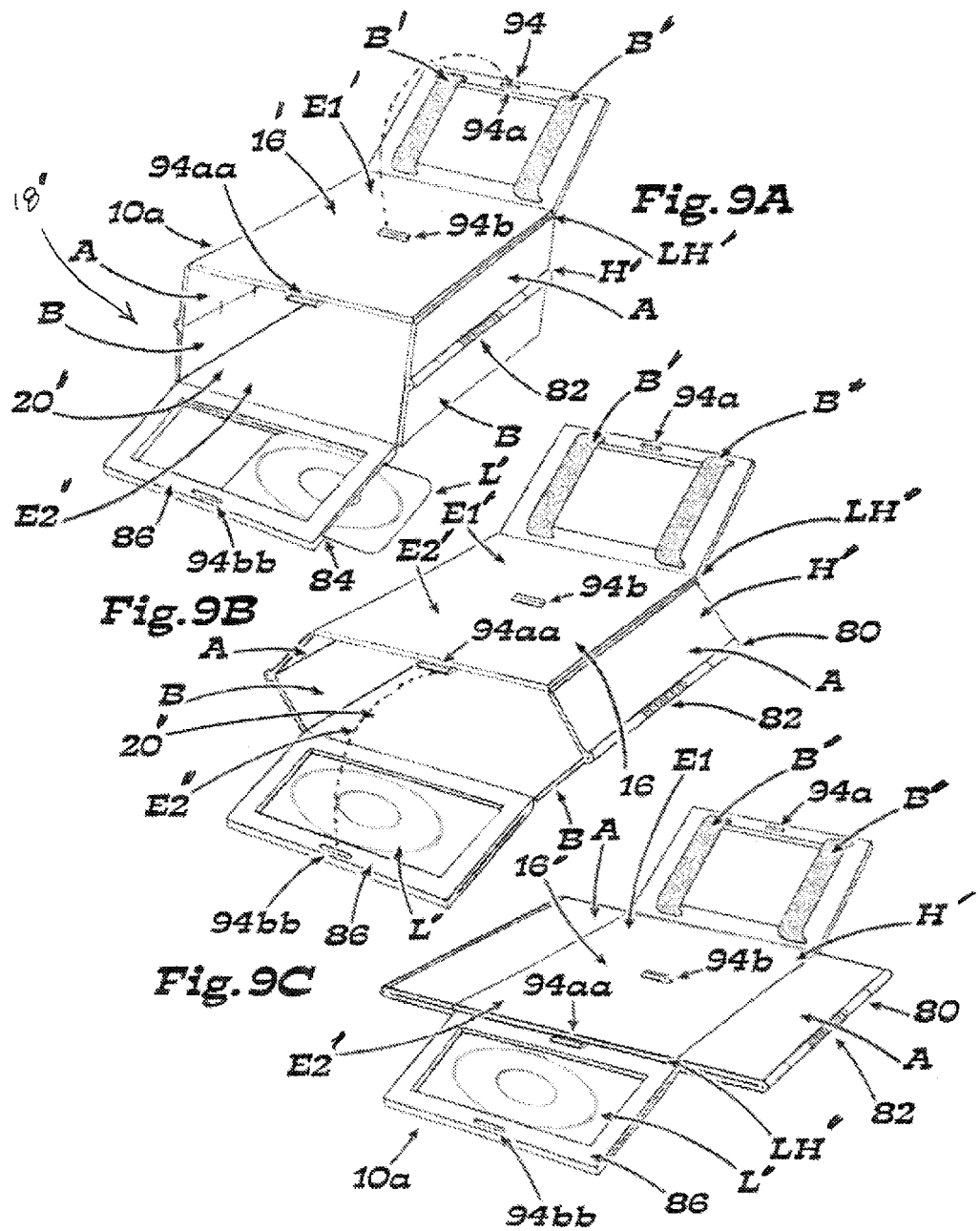

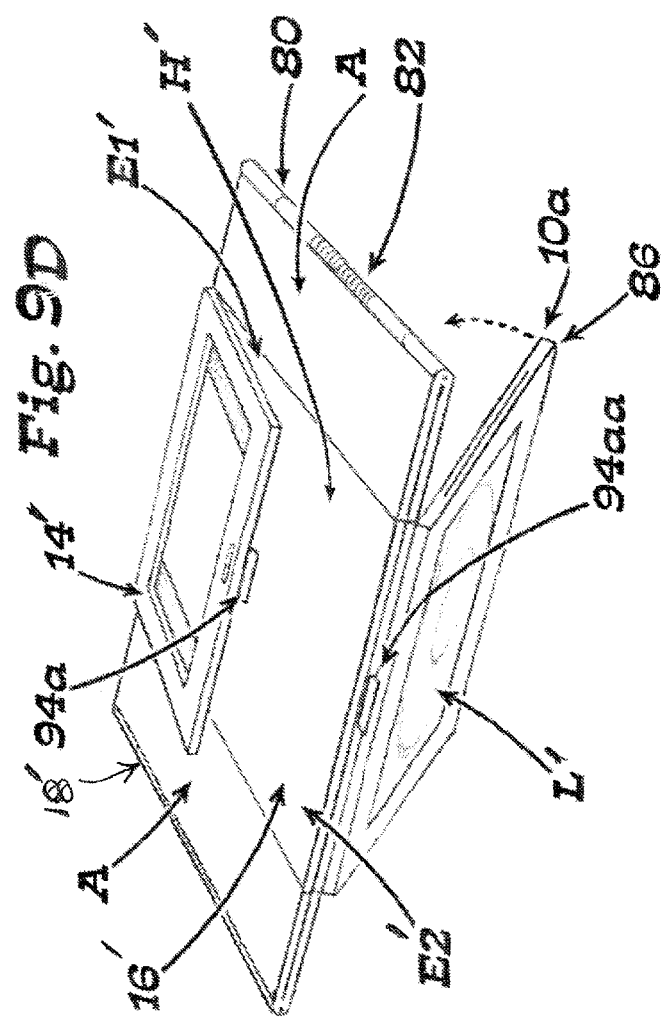

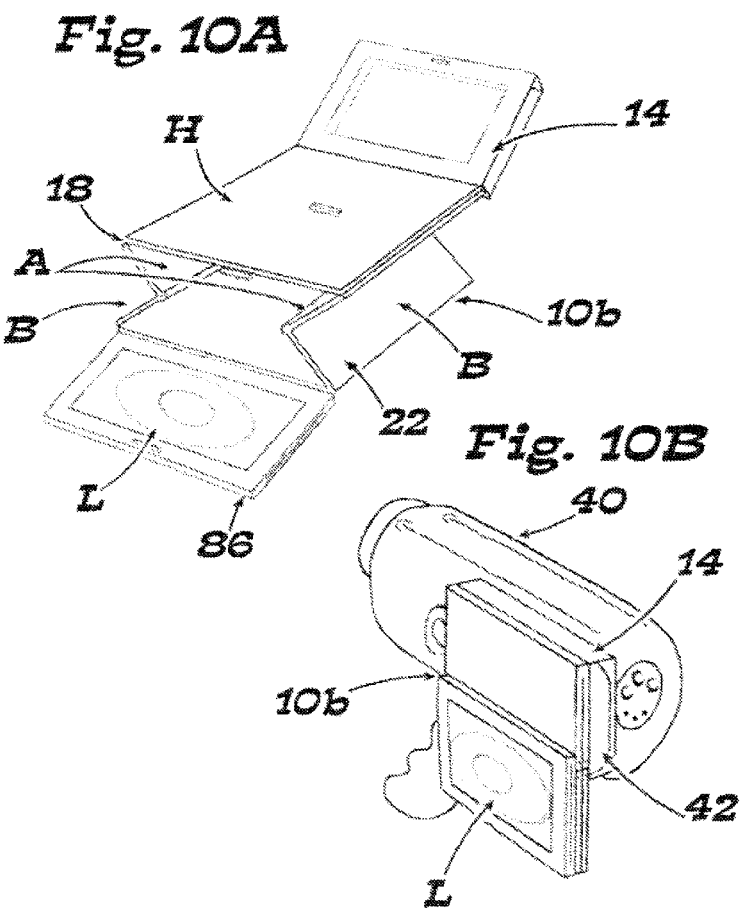

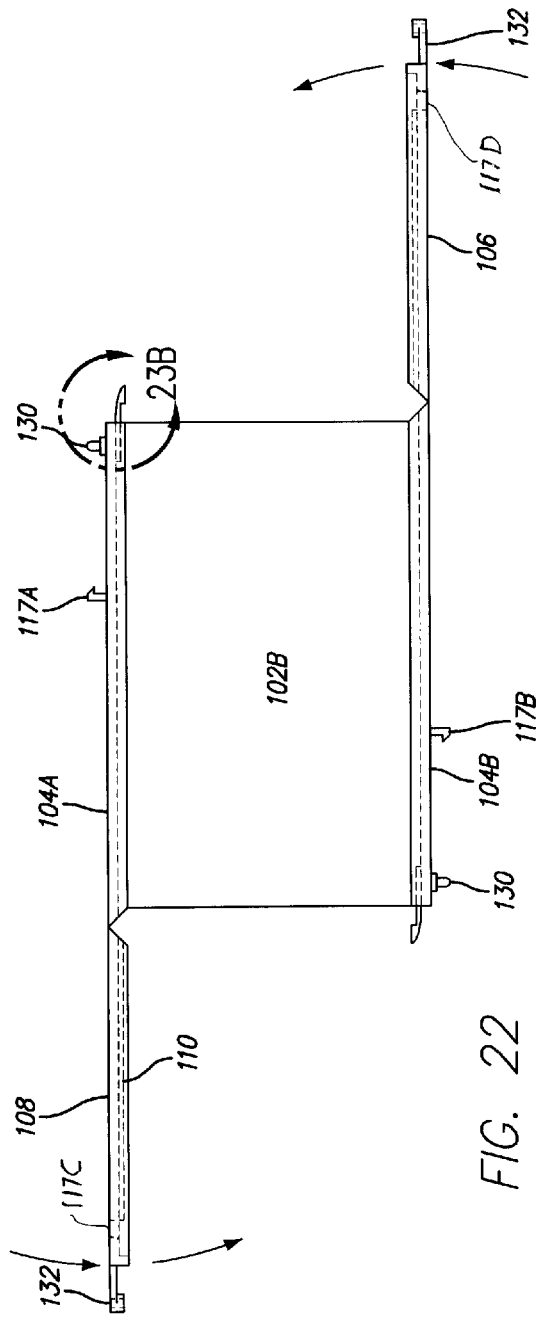
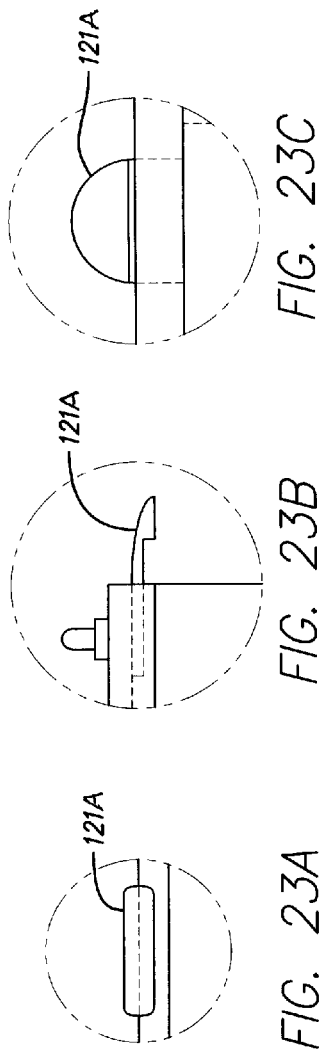

_EYE LEVEL VIEWFINDER AND THREE DIMENSIONAL VIRTUAL REALITY VIEWING DEVICE AND METHOD_

RELATED PATENT APPLICATIONS & INCORPORATION BY REFERENCE

This utility application is a continuation-in-part of application Ser. No. 13/844,308 filed on Mar. 15, 2013 which is a continuation-in-part of application Ser. No. 12/814,436 filed on Jun. 11, 2010 which claims the benefit under 35 U.S.C. 119(e) of U.S. Provisional Patent Application No. 61/218,334 filed Jun. 18, 2010 all of which are incorporated herein by reference and made a part of this application and from which priority is claimed.

BACKGROUND

Small, lightweight, commercially available hand-held cameras have side mounted, wing-like flat panel imagers or LCD monitor screens that are moveably attached to the camera body to pivot between a stored position and an outwardly extended position from the camera body during use. Images of the object being photographed are displayed on the monitor screen. These cameras do not have built-in eye level viewfinders, so the user normally holds the screen away from his or her eyes at a normal reading distance from about 12 to about 18 inches. However, it is difficult—often impossible—to see these screen images in glaring sunlight. Consequently, antiglare shields are sometimes used to cast a shadow on the screen, reducing glare that would wash out the screen image. For example, as taught in U.S. Pat. No. 6,419,367, a rigid device may be used that is inconvenient to store when not being used.

In addition to glare, another problem is camera stability. In general, the user holds such hand-held cameras with only one hand at a normal reading distance away from the eyes. Consequently, it is difficult to follow and capture acceptable images of fast action events like sports without some mechanism such as a tripod for stabilizing the camera. This, however, inhibits mobility. Moreover, since the screen is relatively small, it is difficult to see the image being displayed and track the action being recorded, especially for users with poor vision. Even many "professional" cameras with optical or digital viewfinders that have an ancillary flat panel monitor screens for displaying digital images, these digital images are unmagnified, difficult to see, and also prone to bright-light wash out.

SUMMARY

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "rectangular" includes square.

The words "substantially" and "essentially" have equivalent meanings.

The word "camera" includes a camcorder, still camera, a video camera, and other similar devices for taking moving or still pictures or both.

The phrase "hand held" or "portable" "image display device" includes mobile devices that have access to video imagery in one or more of internal storage, from sources such as through wi-fi, internet, and/or telephony or other wireless sources or by wire from an accompanying device.

My glare blocking device and method has one or more of the features depicted in the embodiments discussed in the section entitled "DETAILED DESCRIPTION." The claims that follow define my glare blocking viewfinder device and method of taking a picture using my device, distinguishing them from the prior art; however, without limiting the scope of my glare blocking device and method as expressed by these claims, in general terms, some, but not necessarily all, of their features are:

One, my glare blocking viewfinder device includes a shadow box having opposed first and second open ends and a predetermined depth dimension. There is a lens at the first end and an attachment mechanism at the second end. The depth dimension of the shadow box is substantially equal to the focal length of the lens.

Two, the lens is mounted to move between positions that cover and uncover the first end, which functions as the viewing end. The lens may be detachable or permanently affixed. In one embodiment, a substantially flat, thin, planar, rectangular lens is used that is mounted by a hinge to the shadow box to move through an arc of substantially 270° when moved in any one direction. For example, the lens may have an edge joined by a living hinge to the shadow box, folding and unfolding the lens to cover and uncover the first end. The lens may be a magnifying lens having a magnifying power, for example, of substantially from 2× to 5×.

Three, the attachment mechanism is adapted to detachably mount the device on a monitor screen of a camera. Upon mounting the device to the monitor screen a substantially rigid structure is provided that functions as a viewfinder substantially at the user's eye level. With the lens covering the first or viewing end, a user can observe the image-bearing surface of the screen at the second end of the shadow box by looking at it through the lens. The width and height dimensions of the lens, screen, and first and second open ends are all substantially equal in the embodiments illustrated. The attachment mechanism may have many forms. It may comprise at least one elastic member extending across the attachment end; it may include a magnet; it may comprise a hook and pile two-component connector; it may comprise an open sleeve with opposed open sidewalls and opposed open ends, enabling the monitor screen to be inserted into the sleeve through one end and images thereon to be viewed through the open sidewalls.

Four, my device has a closed, compact condition that, when in this condition, fits into a pocket of a user. In a folded, substantially planar state in which the shadow box is in the closed condition, the lens is folded inward to abut a surface of the closed shadow box. In one embodiment my device is maintained in this condition until a latch or latches are unlatched, and the device opens. For example, a spring-loaded hinge along a sidewall opens the shadow box automatically upon manual unlatching. In the open condition my device is mounted on a monitor screen to take pictures, and this assembly is very is stable, enabling the user to grasp the device with one hand and the camera with the other hand to track the movement of the subject and hold the assembly against the user's forehead next to the eye during viewing of the monitor screen.

My method of taking pictures uses a camera having a wing-like, side-mounted monitor. According to my method a user attaches my device to the monitor screen with the viewing lens positioned to cover the viewing end, and pressing his or her eye against the lens to view the monitor screen through the lens and shadow box, points the camera at a subject, keeping the camera on the subject by using the device as an eye level viewfinder. When using the embodiment of my device that has a folded and unfolded condition, the user first unfolds my device and the mounted it in the open condition to the screen by the attachment mechanism. The user holds the camera with one hand and the attached device with the other hand when following a subject being photographed, providing stability, control, and rapid tracking of the subject.

These features are not listed in any rank order nor is this list intended to be exhaustive.

In a further embodiment, the invention allows 3D and virtual reality viewing from an image source that can be attached to the box, and in which a pair of spaced apart lenses are applied as part of the viewing end of the box while the image source device is placed at the attachment end to be seen through the box (by viewing through the lenses on the opposite end of the box. The entire structure is made foldable by hinged attachment of the several parts. When an image source device is attached the assembly can be worn on the users head and in use, with straps. Audio source wiring with earphones/earbuds can also be used.

DESCRIPTION OF THE DRAWING

Some embodiments of my device and method are discussed in detail in connection with the accompanying drawing, which is for illustrative purposes only. This drawing includes the following figures (Figs.), with like numerals indicating like parts:

FIG. 1 is a perspective view of one embodiment of my glare blocking viewfinder device in a folded, substantially planar state.

FIG. 2 is a view depicting my device folded as shown in FIG. 1 and being inserted into a shirt pocket of a user.

FIG. 3 is a perspective view of the embodiment of my device depicted in FIG. 1 partially unfolded and looking at a top side of my device with its shadow box closed.

FIG. 4 is a perspective view of the embodiment of my device depicted in FIG. 1 partially unfolded but looking at a bottom side of my device with its shadow box closed.

FIG. 5 is a perspective view of the embodiment of my device depicted in FIG. 1 almost completely unfolded and its shadow box partially opened.

FIG. 6 is a perspective view of the embodiment of my device depicted in FIG. 1 completely unfolded and its shadow box completely opened.

FIG. 7A is a perspective view showing the embodiment of my glare blocking viewfinder device shown in FIG. 1 with its sleeve attachment mechanism partially unfolded.

FIG. 7B is a perspective view similar to FIG. 7A showing my glare blocking viewfinder device depicted in FIG. 1 with its sleeve attachment mechanism folded and latched in position to completely cover an open end of the shadow box.

FIG. 7C is a perspective view showing an alternate embodiment of my glare blocking viewfinder device using a sleeve attachment mechanism similar to that shown in FIGS. 7A and 7B employing a magnetic latch.

FIG. 7D is a perspective view of the embodiment of my glare blocking viewfinder device depicted in FIG. 7D showing the monitor screen of a hand held camera being inserted into a pocket of my device.

FIG. 8B is a perspective view showing still another alternate embodiment using an elastic mesh attachment mechanism to detachably mount my device on the monitor screen of a hand-held camera.

FIG. 8C is a perspective view showing another embodiment using a hook and pile attachment mechanism to detachably mount my device on the monitor screen of a hand-held camera.

FIG. 8D is a perspective view showing yet another arrangement of a hook and pile attachment mechanism to detachably mount my device on the monitor screen of a hand-held camera.

FIG. 8E is a perspective view showing still another arrangement of a hook and pile attachment mechanism to detachably mount my device on the monitor screen of a hand-held camera.

FIG. 8F is a perspective view showing an embodiment of my glare blocking viewfinder device using a magnetic attachment mechanism to detachably mount my device on the monitor screen of a hand-held camera.

FIG. 9 is a perspective view of yet another embodiment of my glare blocking viewfinder device.

FIG. 9A is a perspective view of my glare blocking viewfinder device of FIG. 9 partially unfolded and showing the lens being inserted into a slot of a frame attached to the shadow box.

FIG. 9B is a perspective view of my glare blocking viewfinder device of FIG. 9 showing opposed sidewalls of the shadow box partially collapsed.

FIG. 9C is a perspective view of my glare blocking viewfinder device of FIG. 9 showing the shadow box completely collapsed.

FIG. 9D is a perspective view of my glare blocking viewfinder device of FIG. 9 showing its wall including the lens and the sleeve attachment mechanism is folded over the collapsed shadow box.

FIG. 10A is a perspective view of another embodiment of my glare blocking viewfinder device similar to that shown in FIG. 9.

FIG. 10B is a perspective view of the embodiment of my device shown in FIG. 10A mounted for storage on a hand-held camera

Figure 16A:
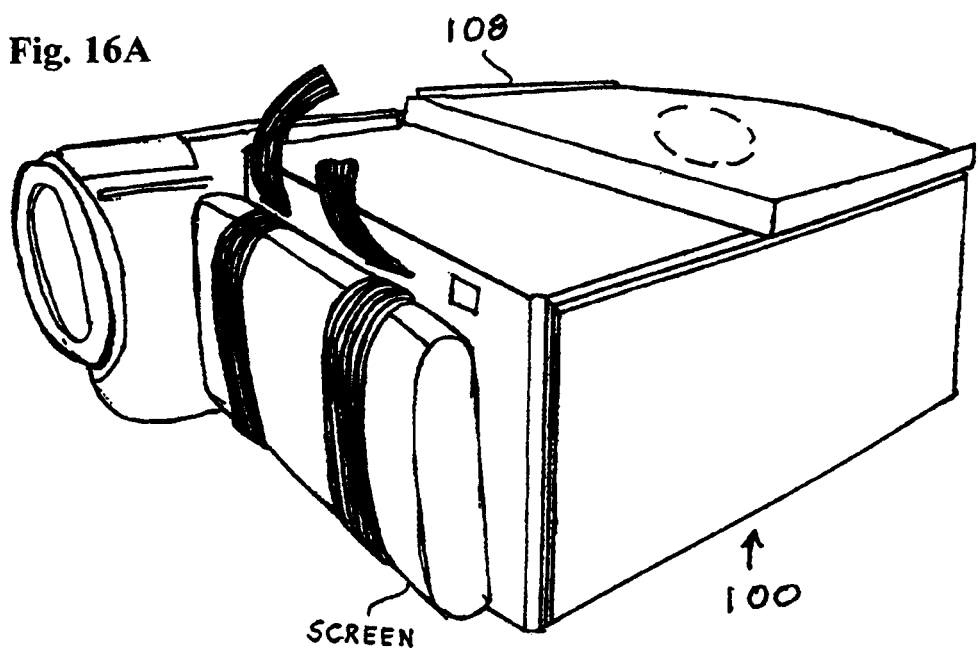
FIG. 16A is a perspective of the embodiment attached to the screen of a camera in which the lens has been rotated 270 degrees from the in-use position to a stored position whereby the device has been converted from a viewfinder device to a glare reduction device.
Figure 16B:
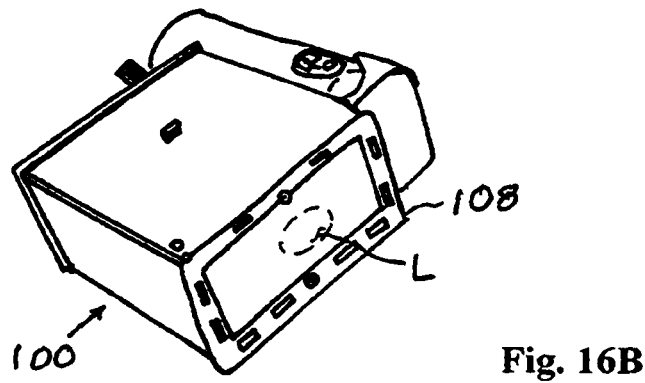

FIG. 16B is a perspective of the embodiment attached to the screen of a camera in which the lens is fastened in place.

Figure 17A:
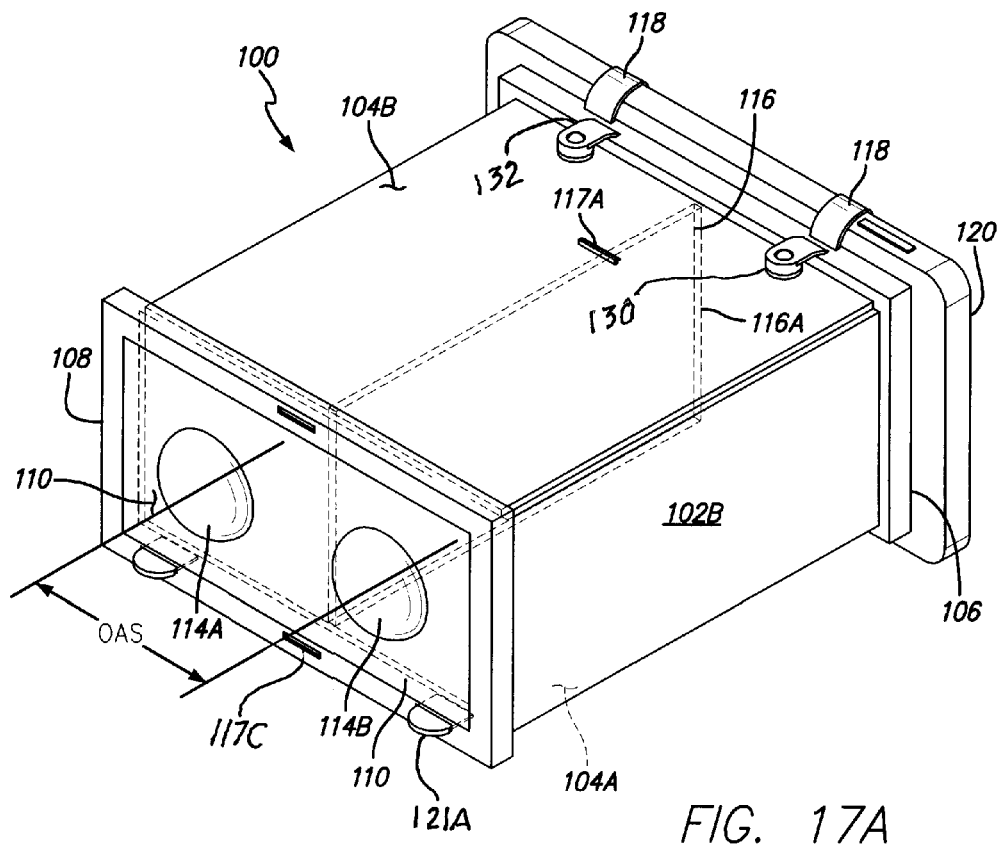

FIG. 17A is a perspective of an alternative embodiment employing two spaced apart optical lenses.

Figure 17B:
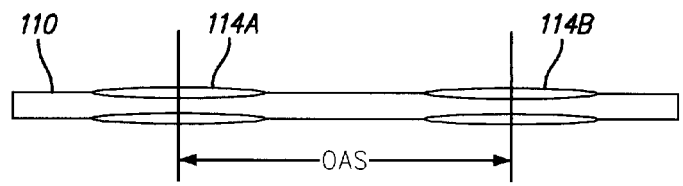

FIG. 17B is a partial view of the alternative embodiment showing two spaced apart optical lenses.

Figure 18:
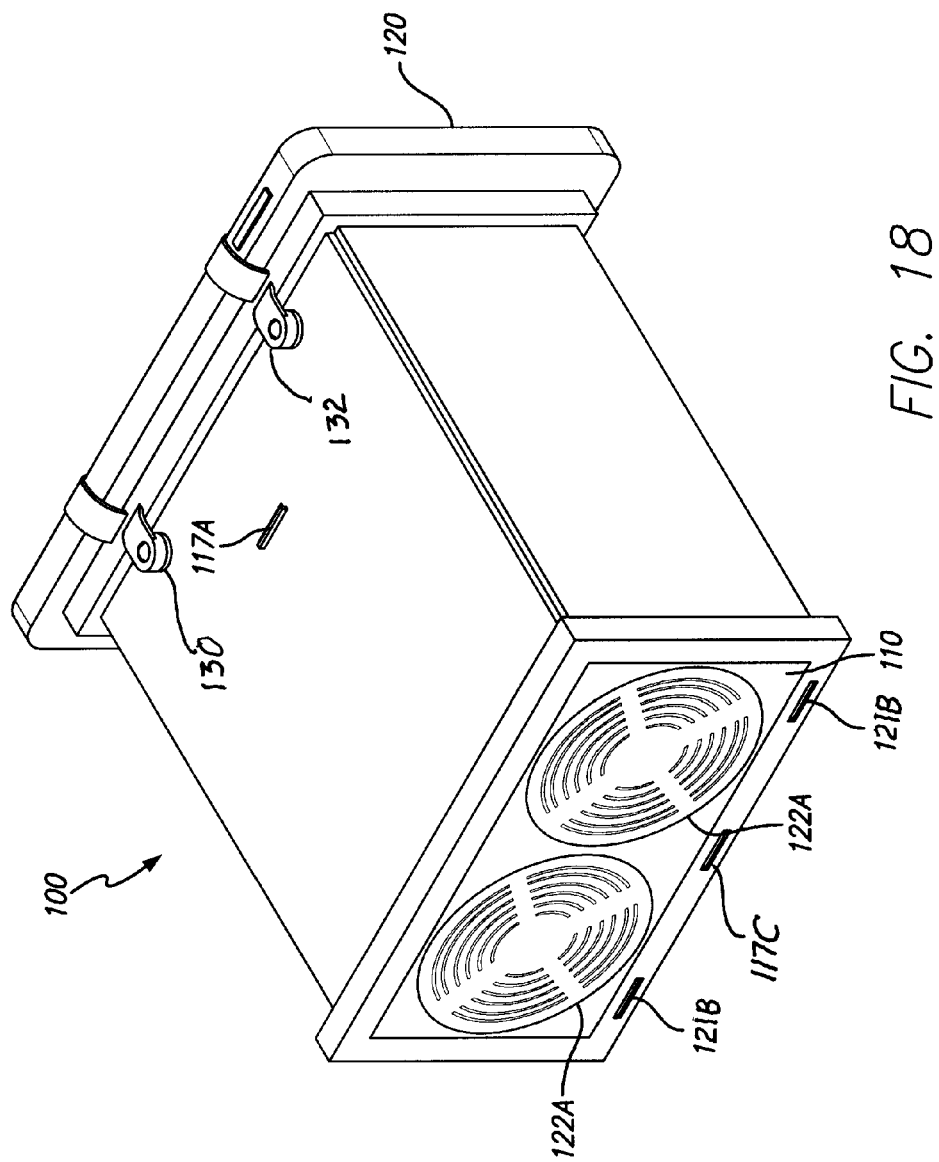

FIG. 18 is a perspective view of the alternative embodiment employing two spaced apart planar Fresnel lenses.

Figure 19:
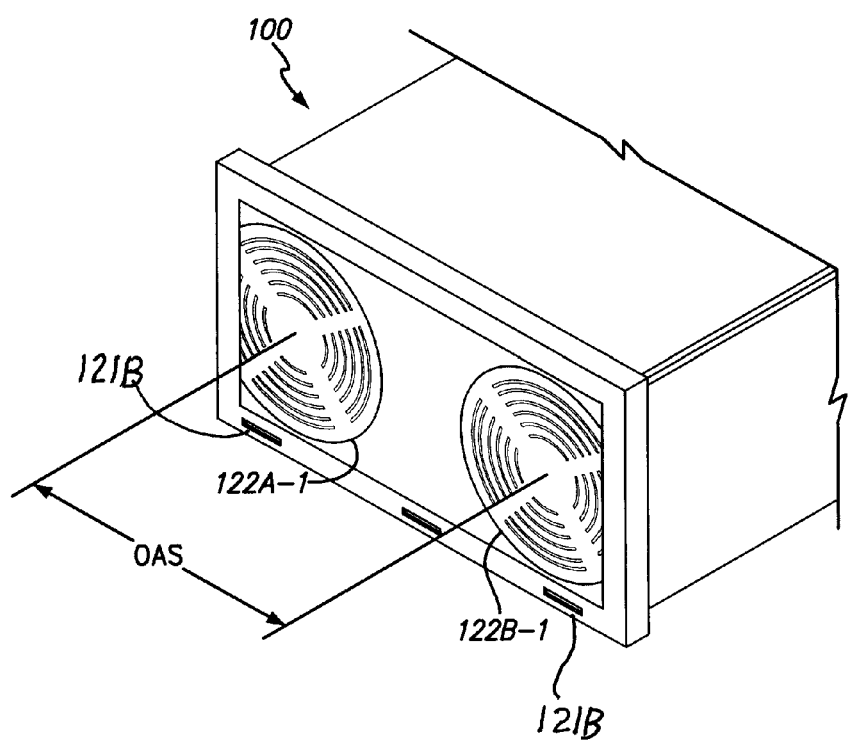

FIG. 19 is a partial perspective view of an embodiment having planar Fresnel lens which are spread apart such that part of the lenses is absent.

Figure 20:
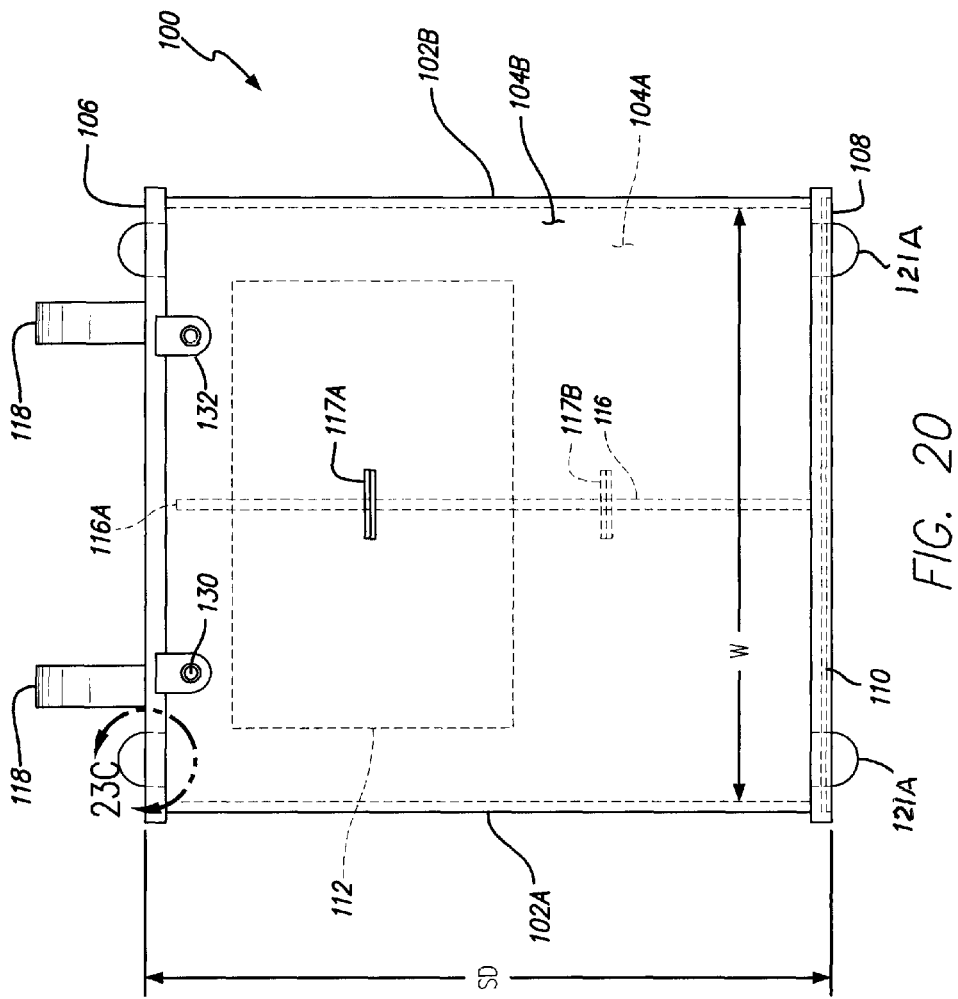

FIG. 20 is a top view of the device.

Figure 21:
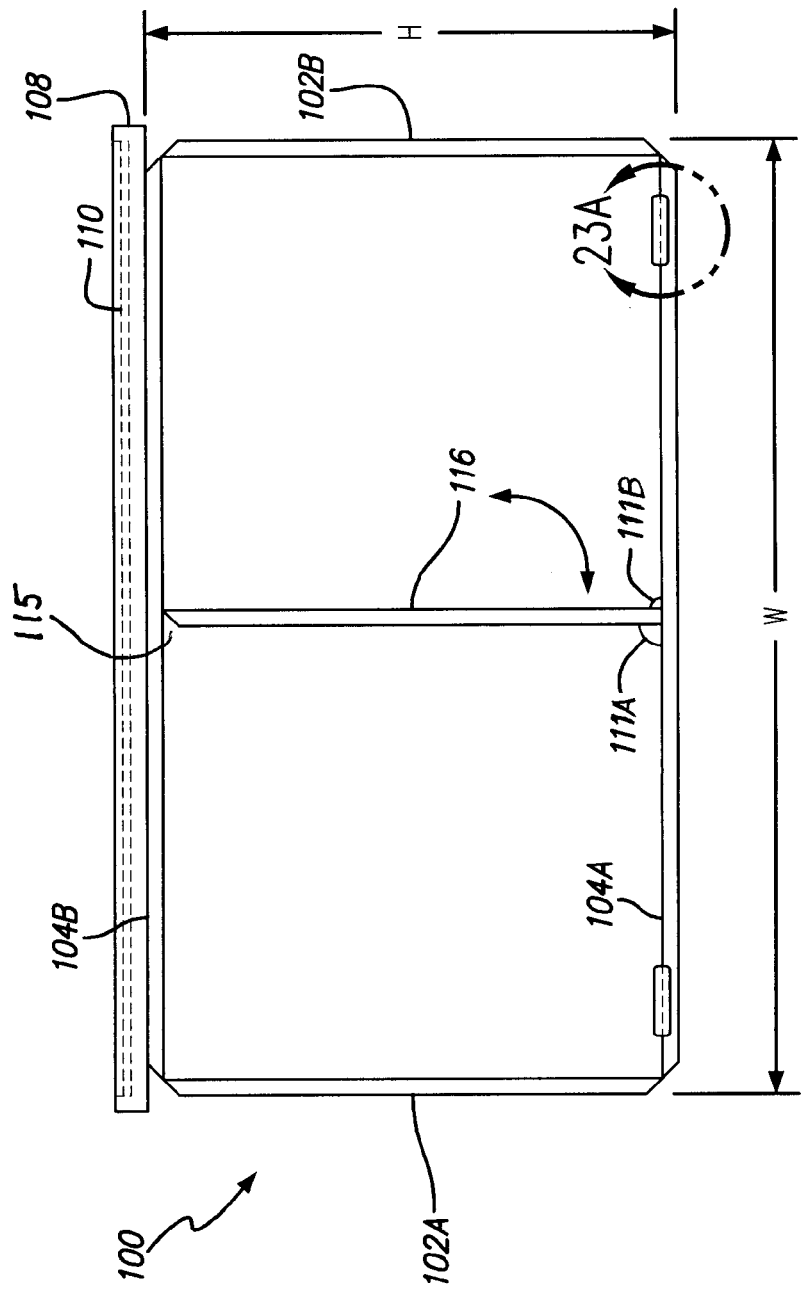

FIG. 21 is a view looking into the box from the viewing end with the viewing frame in the fully out-folded position.

FIG. 22 is a view from the side in which the viewing frame and the attachment frame are partially rotated into the in-use position.

FIGS. 23A, 23B and 23C show enlarged views of the retaining tabs as illustrated in earlier figures.

Figure 24:
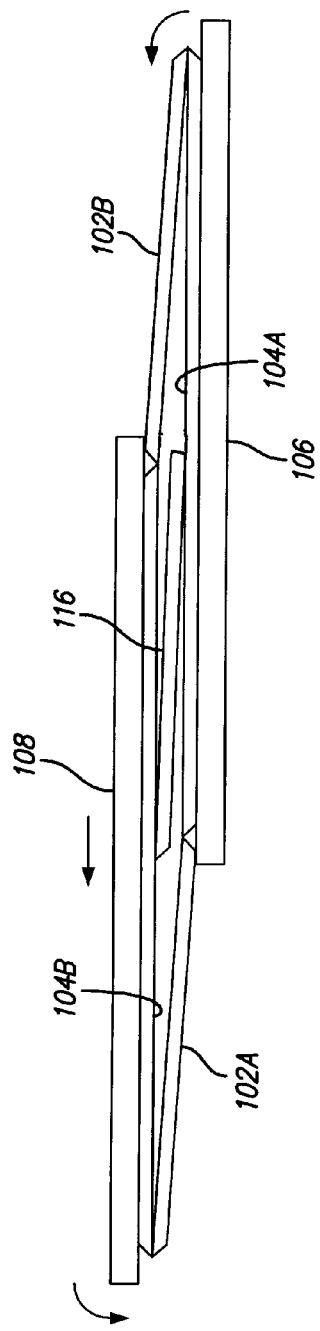

FIG. 24 is a view of the device in folded position from the side.

Figure 25:
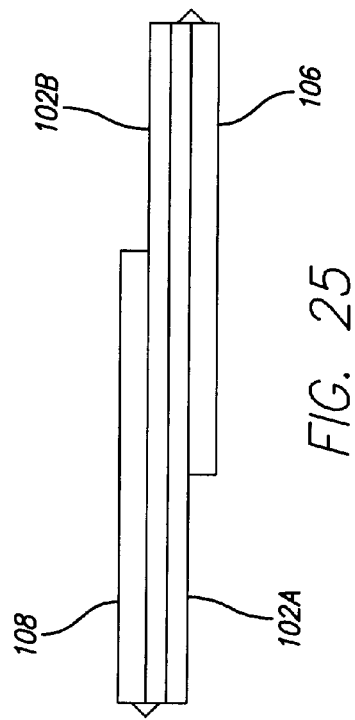

FIG. 25 is a view of the device in folded position, looking in from the rear, from the viewing end.

Figure 26:
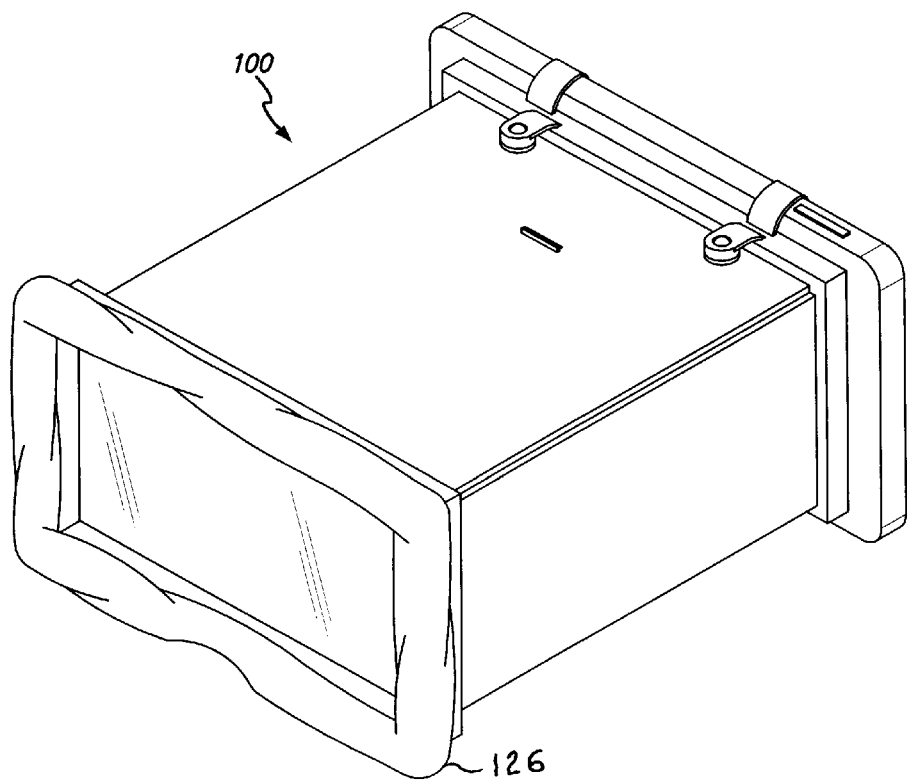

FIG. 26 is a perspective view showing a facial cushion on the viewing frame.

Figure 27:
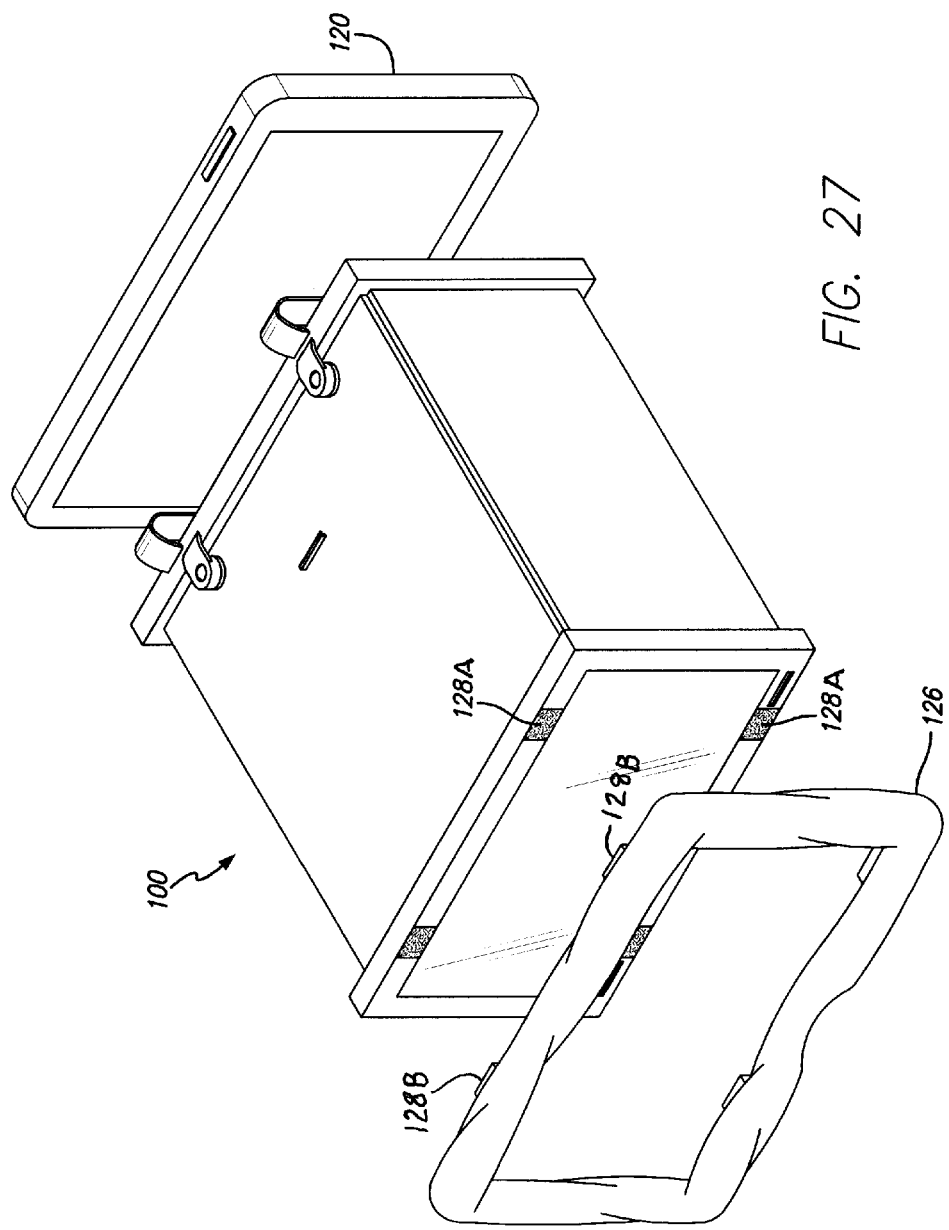

FIG. 27 is an exploded perspective view showing a facial cushion attachable and detachable such as with hook and loop fasteners.

Figure 28:
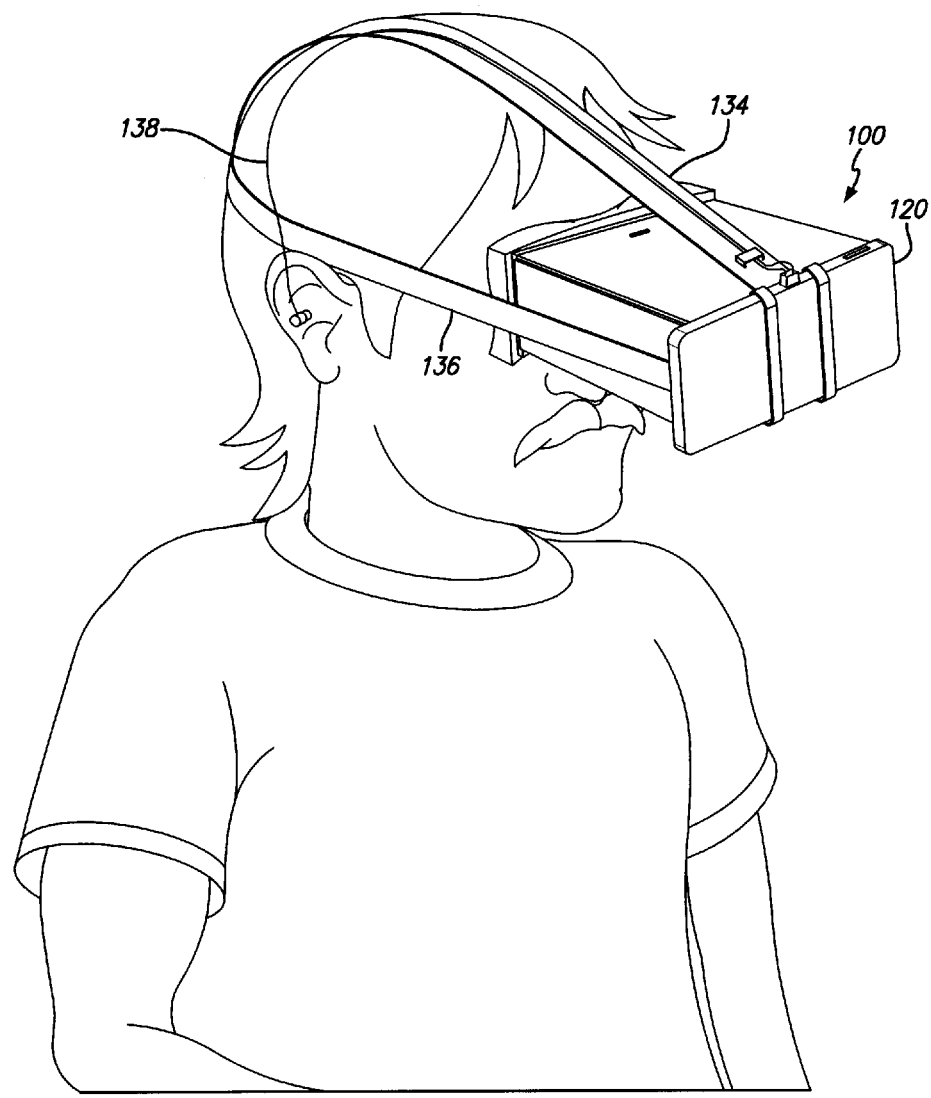

FIG. 28 shows an embodiment of the invention as worn by a user.

DETAILED DESCRIPTION

Figure 11:
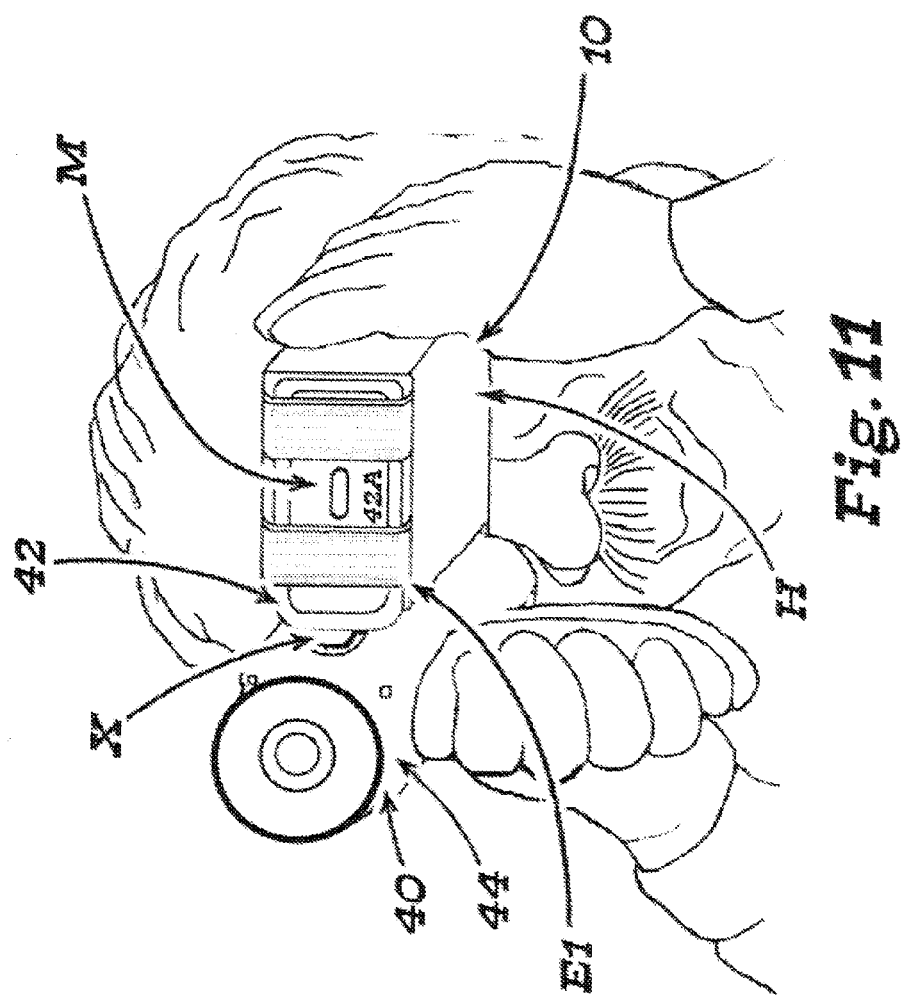
FIG. 11 is a perspective view of a user recording an action event with a hand-held camera equipped with an embodiment of my device using the one version of the attachment mechanism illustrated in FIG. 8A.

As illustrated in FIGS. 1 through 10, my device 10 conveniently slides on and off a monitor screen 42 of a hand held camera 40. (Although the camera 40 illustrated is hand-held, the camera may be mounted to a tripod or monopod). My device 10 blocks glare, provides an eye level viewfinder, magnifies the image on the monitor screen 42, and stabilizes the camera 40. It is particularly advantageous when using the hand-held video camera 40 to capture pictures of, for example, outdoor or indoor, fast action, dynamic events such as sporting contests and the like. My device 10 is adapted to be detachably mounted on a side mounted, panel-type, monitor screen 42 of the camera 40. As shown in FIG. 8A, this monitor screen 42 may include a microphone M in an outer, non-imaging surface 42a of the screen 42. The image-bearing surface (not shown) is opposite the surface 42a. As shown in FIG. 8A, this monitor screen 42 is substantially flat and rectangular and has a width w substantially from 2.5 to 4 inches and a height h substantially from 2.5 to 3.5 inches. Its thickness is typically substantially from 1/8 to 1/4 inch. The panel monitor screen 42 may be attached to a side of the body 44 of the camera 40 by a pivot mounting X (FIG. 11).

Such small, hand-held cameras usually do not have an eye level viewfinder, thus requiring the user to hold the camera away from the eyes the normal reading distance. My device 10 functions as a viewfinder as illustrated in FIG. 11 by a user holding his or her eye up against a transparent magnifying lens L, which may be permanently attached to or integral with a collapsible shadow box H. In an alternate embodiment depicted in FIGS. 9 through 9E the lens is detachably mounted to the shadow box H. The lens L, because it is hingedly attached to the shadow box H, is capable of flipping over to cover an open end E2 or instantly flipping out of the way onto a top wall 20 (or bottom wall) of the shadow box H. The lens L may be a Fresnel lens.

My device 10 may be made of a sheet of plastic or other material that lends itself to formation of the shadow box H using thermoplastic manufacturing techniques as an integral, single piece construction. As illustrated best in FIGS. 1 through 6, the shadow box H may comprise four opaque walls 16, 18, 20, and 22 that are joined, for example, by a living hinge LH (FIG. 5) along longitudinal edges of each pair of adjacent walls 16, 18 and 18, 20 and 20, 22 and 22, 16. The shadow box H has opposed open ends E1 and E2. The end E1 is the attachment end to which the monitor screen 42 is detachably mounted and the end E2 is the viewing end that the user holds against his or her eye when viewing an image on the monitor screen as illustrated in FIG. 11. The lens L is substantially flat, thin and rectangular, and is integral with the shadow box H, being, as shown in FIG. 5, hingedly mounted by a living hinge LH to the end E2 along the one edge ED1 of the shadow box H wall 20. A suitable lens L is a Fresnel lens because it is very thin, flat and is available in a wide range of magnifying powers, for example, in my device 10, acceptable magnification is substantially from 2× to 5×. The lens L is permanently affixed to the shadow box H and folds and unfolds to cover and uncover the open viewing end E2, the lens moving through an arc of substantially 270° when moved in a clockwise or counter-clockwise direction.

Figure 8A:
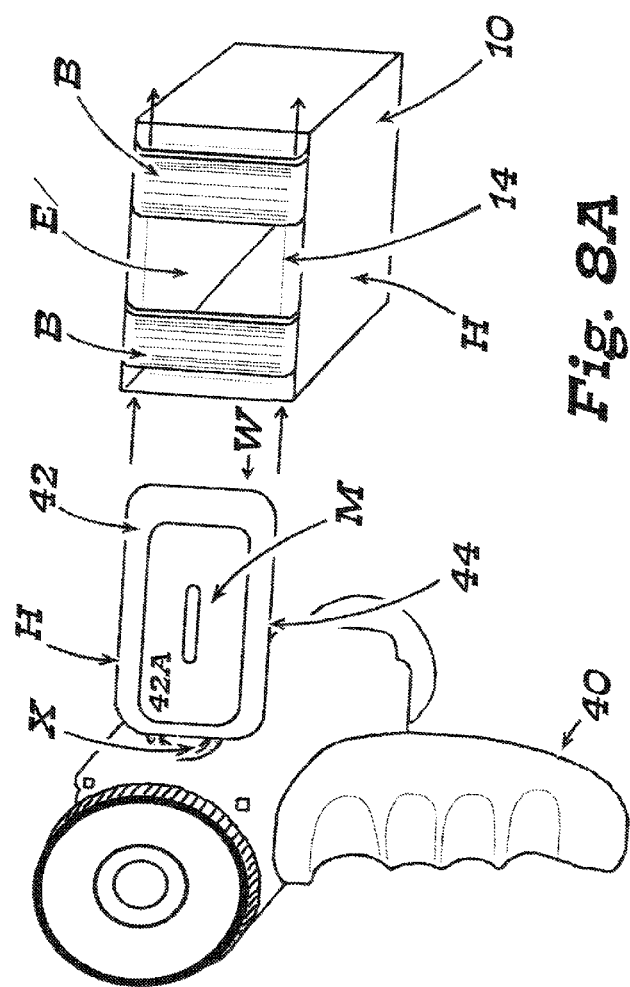
FIG. 8A is a perspective view showing an alternate embodiment using an elastic band attachment mechanism to detachably mount my device on the monitor screen of a hand-held camera.

When my device 10 is in a completely folded state as shown in FIG. 1, it may be conveniently and safely placed in a shirt pocket of a user as depicted in FIG. 2. In FIG. 6 my device 10 is shown in its completely unfolded state with the shadow box H open completely. When in the unfolded state as shown in FIGS. 8A through 8F, my device 10 is detachably connected to the monitor screen 42 projecting substantially at a right angle to the body 44 of the camera 40 by attaching means at the end E1 of the shadow box H. Any suitable attaching means may be used, and the following are examples of such attaching means: The embodiment shown in FIGS. 7A through 7C depict using a hinged sleeve attachment mechanism 14; the embodiment shown in FIG. 8A depicts using a pair of elastic bands B; the embodiment shown in FIG. 8B depicts using an elastic mesh EM attachment mechanism; the embodiments shown in FIGS. 8C through 8E depict using different versions of hook and pile H/P attachment mechanisms; and FIG. 8F depicts using magnets 60 as the attachment mechanism.

In the embodiment illustrated in FIGS. 7A and 7B, the sleeve attachment mechanism 14 comprises an open wall structure 50 forming a pocket P that receives the screen 42. As illustrated best in FIG. 7A, the wall structure 50 is attached by a living hinge LH to the wall 20 along the edge ED2 and folds over the open end E1 when the shadow box H is in an open condition as shown in FIG. 6. Alternately, sleeve attachment mechanism may be attached by flexible narrow elastic strips. The monitor screen 42 is inserted into the pocket P to detachably mount my device 10 when the screen projects substantially at a right angle to the body B of the camera 40 as shown in FIGS. 8A through 8F. The opposed sidewalls SW1 and SW2 are open. Consequently, when my device 10 is mounted on the monitor screen 42, the images being displayed on the monitor screen 42 may be observed through the lens L and a microphone M (FIG. 8A) in the outer surface 42a of the screen is uncovered.

Upon detaching by removal of the screen 42 from the pocket P, the wall structure 50 is folded inward towards the collapsed shadow box H. It may be first be folded to overlie the outer surface of the wall 20. Or, as shown in FIG. 1, to overlie the folded up lens L—an ideal folded condition where the wall structure 50 at least partially covers and protects the lens L that has been folded inward to abut an outer surface of the wall 20 before the wall structure 50 is folded inward. In either completely folded up arrangement, my device 10 is in a substantially planar state. In FIGS. 7A and 7B a hook and pile H/P two-component latch is depicted. In FIGS. 7C and 7D magnets 60 are used as a two-component latch. These two-component latches hold the wall structure 50 in the closed position after the monitor screen has been inserted into the pocket P.

In the embodiment illustrated in FIG. 8A, the pair of elastic straps or bands B eliminate use of the wall structure 50. The pair of elastic bands B are spaced apart and stretch across the width of the open end E1 over the exterior surface 42*a* of the monitor screen 42 inserted underneath the bands B, mounting my device 10 on the screen.

FIG. 8B depicts an elastic mesh EM stretching across the width of the open end E1 over the exterior surface 42*a* of the monitor screen 42 inserted underneath the mesh, mounting my device 10 on the screen. This mesh EM permits audio transparency for those wing-like monitor screens 42 having their microphones M placed on the surface 42*a* of the screen. This mesh EM is the equivalent of a flexible shadow box of like dimensions and elasticity but no openings, eliminating the need to provide openings for microphones.

FIGS. 8C through 8E depicts different arrangements of hook and pile H/P two-component connectors as the attachment mechanism. The pile may be on hinged flaps along the open end E1 and the hooks may be fastened to the outer, non-viewing surface 42*a* of the monitor screen 42.

As shown best in FIG. 6, in the open state, the shadow box H may have dimensions substantially as follows: a width w from 3 to 6 inches, a height h from 3 to 5 inches, and a depth d from 3 to 6 inches. The width w and height h of the shadow box H are substantially the same as the width and height dimensions of the monitor screen 42. The depth d of the shadow box H is substantially equal to the focal length of the lens L, which substantially ranges from 3 to 5 inches. Typically the lens has a magnifying power of 2× to 5×. Because of the relationship of the depth d of the shadow box H to the focal length of the lens L, the user can hold his or her eye next to the lens L and against the user's forehead as shown in FIG. 11. When a wider shadow box H is used, for example substantially from 3.5 to 5 inches, both eyes may be used to view the monitor screen. With the advent of 3D cameras, my device can be adapted to provide separate left and right eye images as the camera shoots a 3D picture. Using my device 10 as an eye-level viewfinder and holding the camera 40 steady with both hands, in this example, the user grasps my device with the left hand and holds the camera with the right hand. And with my device 10 so mounted to the camera 40, the shadow box's function is to block sunlight directly impinging on the image-bearing surface (not shown) of the monitor screen 42. This prevents glare so the user can see the image-bearing surface of the monitor screen 42 without sunlight interfering with, or washing out, the screen image or the user's vision.

An alternate embodiment of my device designated by the numeral 10*a* is illustrated in FIGS. 9 through 9D. My device 10*a* is similar in most respects to my device 10 discussed above, except its shadow box H' includes opposed collapsible, opaque sidewalls 18' and 22'. Each of these sidewalls 18' and 22' are divided into substantially equal sized rectangular segments A and B that are connected by an elongated hinge 80 with a coiled or other type spring 82 along its length. A living hinge with tension acting spring also may be used. The shadow box H' also includes two additional opaque walls 16' and 20'. As illustrated in FIGS. 9A through 9D, these walls 16', 18', 20' and 22' are joined along longitudinal edges of each pair of adjacent walls 16', 18' and 18', 20' and 20', 22' and 22', 16' by, for example, a living hinge LH'. The shadow box H' has opposed open ends E1' and E2'. The end E1' is the attachment end and the monitor screen 42 is detachably mounted thereto using a sleeve attachment mechanism 14' connected by a living hinge LH' to the end E1' of the shadow box H'. The sleeve attachment mechanism 14' has a frame 90 with a pair of elastic bands B' stretched across the frame. The end E2' is the viewing end that the user holds against his or her eye or eyes when viewing an image on the monitor screen 42 as illustrated in FIG. 11. In this embodiment a lens L' is detachably mounted for replacement at low costs if damaged and slides into a slot 84 in a frame 86 attached by a living hinge LH' to the end E2' of the shadow box H'.

As best depicted in FIGS. 9A through 9D, my device 10*a* is folded into a substantially flat, planar structure. There are two-component latches 94 that engage upon folding my device 10*a* and hold it in this flat and planar condition until unlatched. Each latch 94 has one component on one wall and on an opposed wall the other component. For example, a suitable two-component latch 94 may comprise a finger 94*a* as one component and a channel 94*b* as the other component, with the finger fitting tightly in the channel until manually levered to disengage. These latches 94 upon being engaged hold my device 10*a* in the flat and planar condition until unlatched. Then the spring 82 automatically unfolds my device 10*a* into the condition shown in FIG. 9A. The latch 94 at the end E1' between the frame 86 and the top wall 16' is, however, re-latched by engaging the finger 94*aa* and the channel 94*bb* to position the lens L' as shown in FIG. 9. This properly positions the lenses with respect to the shadow box H'.

Still another alternate embodiment of my device designated by the numeral 10*b* is illustrated in FIGS. 10A and 10B. My device 10*b* is similar in most respects to my device 10*a* discussed above except it employs hinges 82' that fold the sidewalls 18' and 22' inward. When completed folded into a compact structure, my device 10*b* is conveniently mounted by its sleeve attachment mechanism 14' to a folded inward monitor screen 42 of the camera 40 as illustrated in FIG. 10B.

To use a camera equipped with my device 10, a user presses his or her an eye or eyes against the lens L to view the image-bearing surface of the monitor screen 42 through the lens L and points the camera 40 at, and follows a moving subject, keeping the camera steady and on the subject by using my device 10 as an eye level viewfinder. Thus, while the user holds the combination of the camera 40 and my device 10 steady with both hands (one hand gripping the camera and the other hand gripping my device), he or she moves the camera in a controlled manner to follow the action with the camera and simultaneously views the event or subject through my device's viewfinder lens L that magnifies the image on the camera's screen. My device 10 is sufficiently rigid for pressing against the user's face for acquiring fast action images yet instantly collapsible for storage in a shirt pocket.

Upon detaching by removal of the screen 42 from the attachment means of any of the embodiments, the shadow box is collapsed. In the case of the sleeve attachment mechanism 14, the wall structure 50 may be first folded to overlie the outer surface of the wall 20. Or, as shown in FIG. 1, to overlie the folded up lens L—an ideal folded condition where the sleeve attachment mechanism 14 at least partially covers and protects the lens that has been folded inward to abut an outer surface of a wall before the wall structure 50 is folded inward.

My device can also be configured to fold flat and be attached to the camera or the back of the wing viewfinder for carrying convenience without interfering with the functioning of the camera in its normal mode. It can then be erected for use as the glare blocking and magnifying device as described herein. In just about any folded up arrangement, each one of the embodiments my device are in a substantially planar state. My device provides a quick on/off stabilizing and magnifying eye level viewfinder that is foldable, small and flat enough to fit in a man's shirt pocket.

Figure 12A:
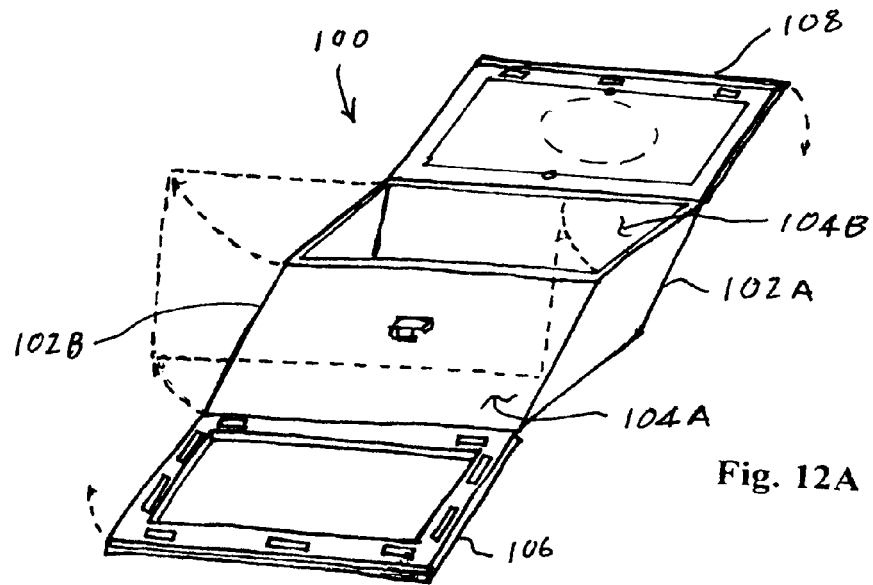
FIG. 12A is a perspective view showing the direction of motion for the collapse of the embodiment in the embodiment in which the lens is mounted in a rectangular frame which is hinged to one side of the shadow box and the attachment mechanism is a frame which is hinged to an opposing surface of the shadow box.
Figure 12B:
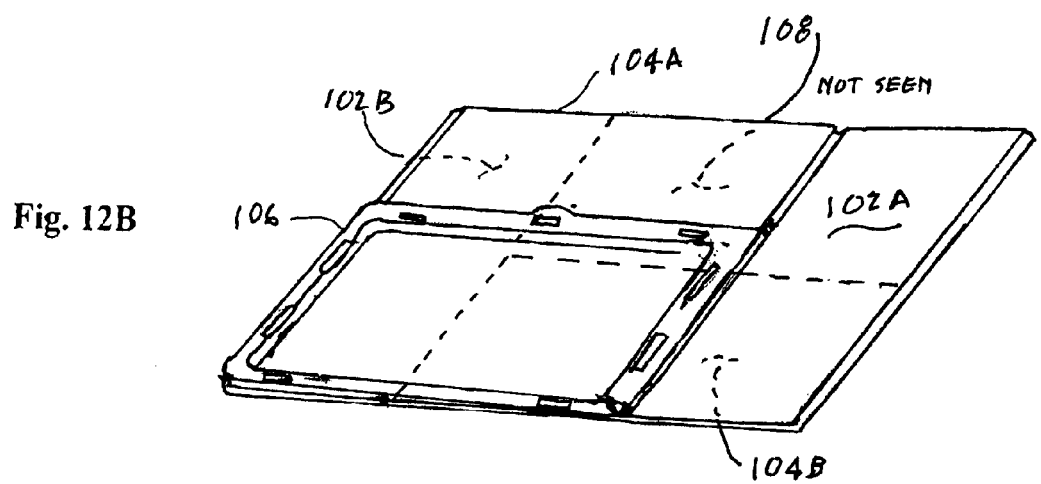
FIG. 12B is a perspective view showing the collapsed embodiment after the motion indicated in FIG. 12A.

FIG. 12A shows my device 100 being folded into its most compact flat configuration in which the box forming panels, vertical panels 102A and 102B, horizontal panels 104A and 104B are attached by living hinges (the entire box being made of a single molded piece of thermoplastic) and an attaching frame 106 (elastic members not shown) is attached by a living hinge to one of the horizontal panels 104A or 104B and the lens holding frame 108 holding a lens L is attached by a living hinge to the other of horizontal panels 104A or 104B. Note the terms vertical and horizontal are for easy reference but do not limit use of the device to any particular orientation. As shown by the arrows, the box forming panels fold down and the attachment frame and the lens frame also fold each into contact with the panel to which it is hinged. This then forms the very compact, flat configuration as shown in FIG. 12B which fits easily into a pocket or purse or small carrying bag.

Figure 13:
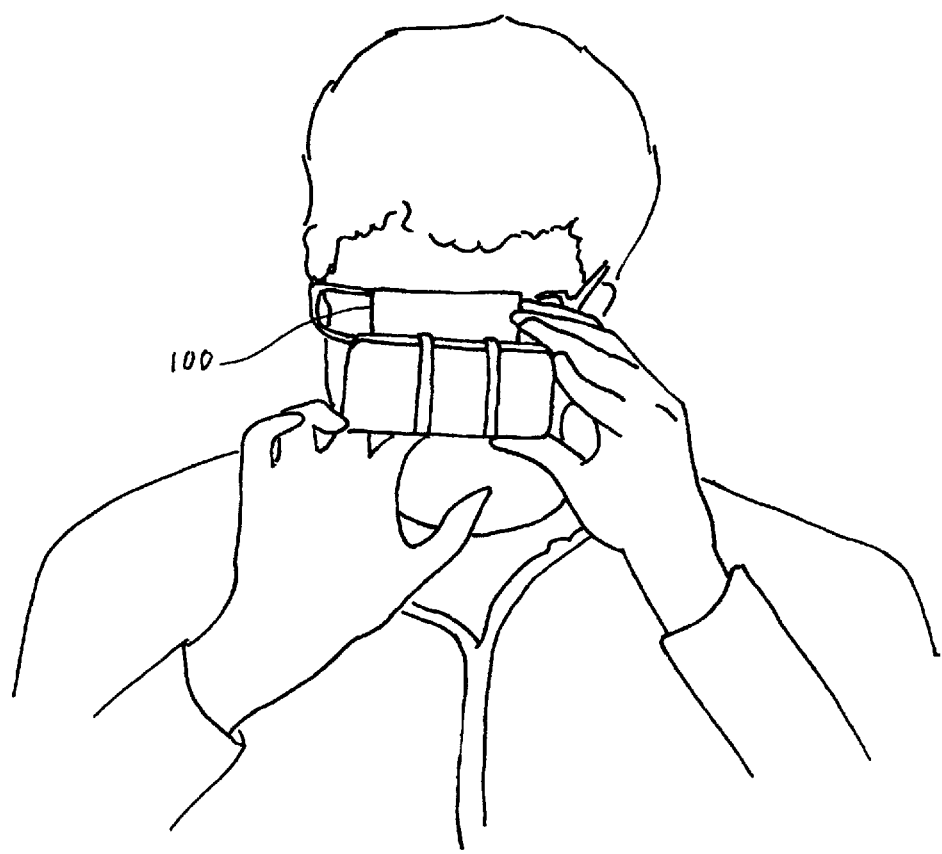
FIG. 13 is a perspective showing the embodiment attached to a smart phone device and in use.
Figure 14:
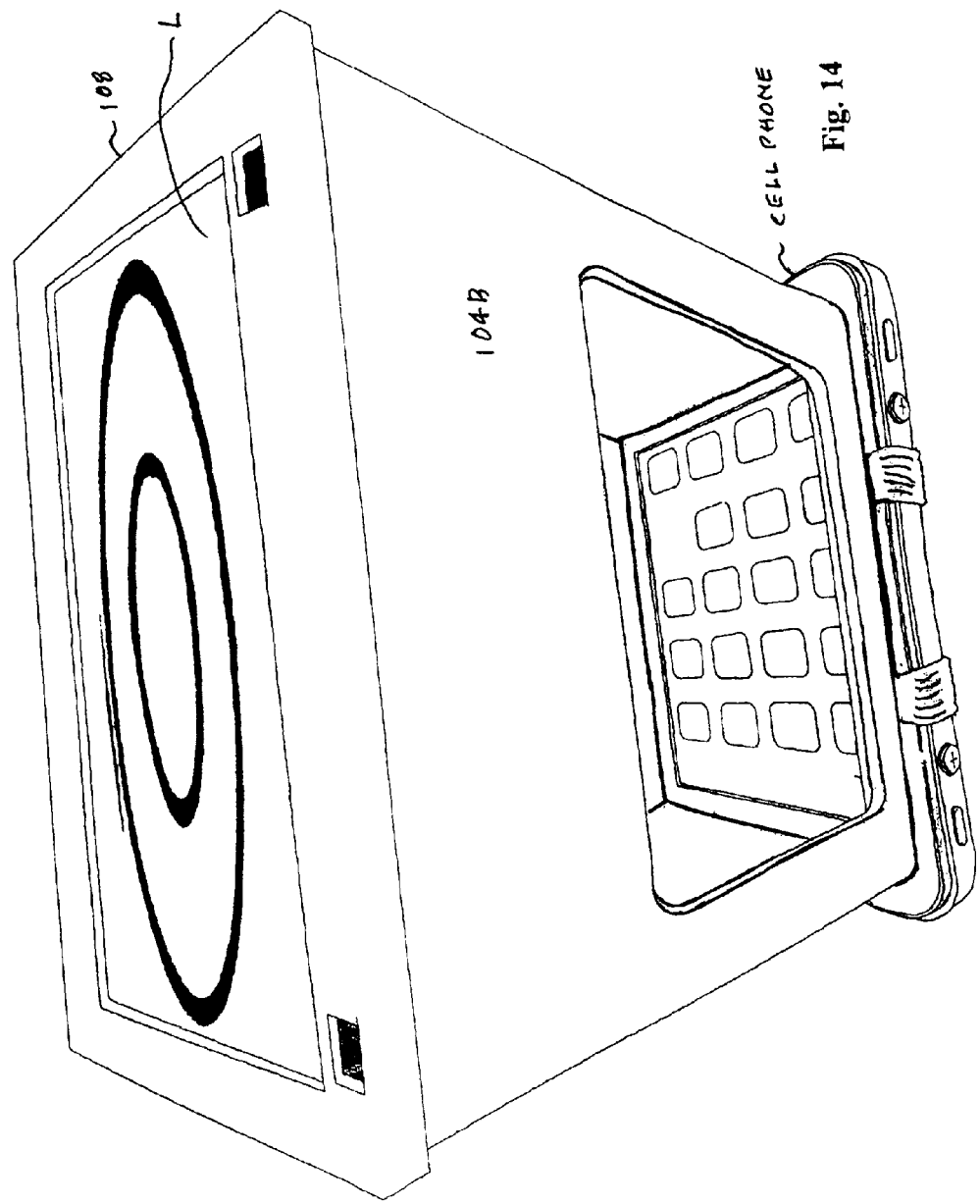
FIG. 14 is a perspective of the embodiment attached to a smart phone device in which there is an opening that allows the user to interact with the screen of the device attached to the embodiment.
Figure 15:
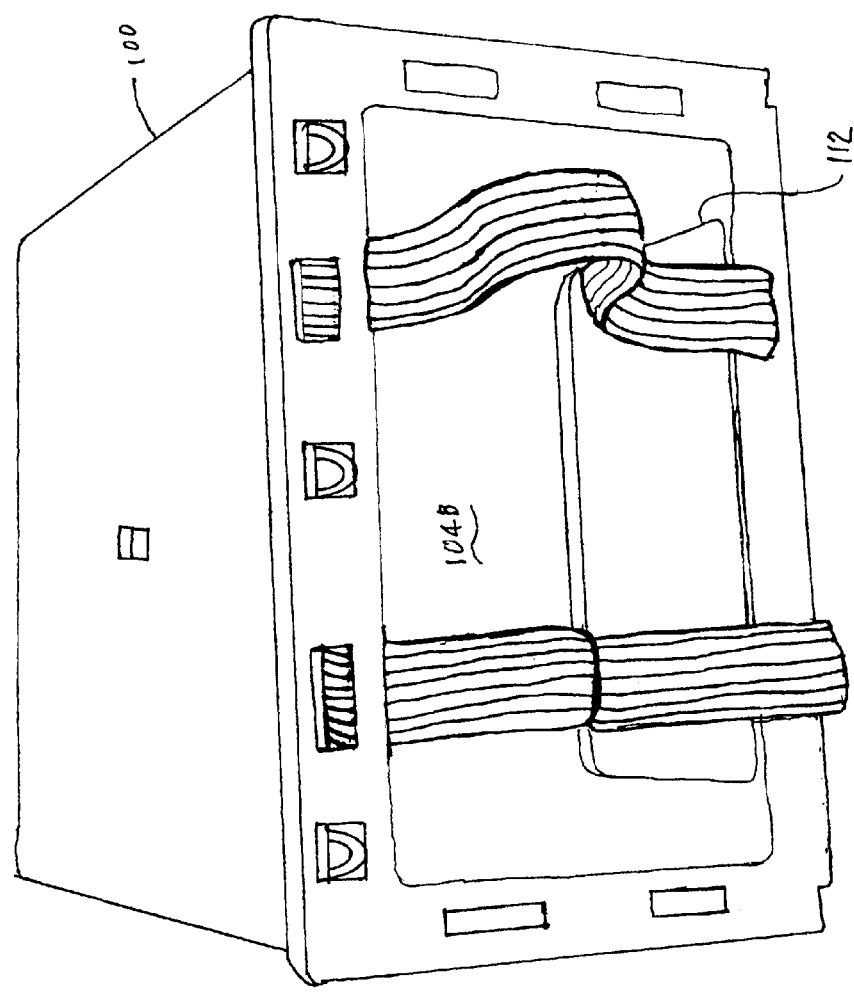
FIG. 15 is a second perspective of the opening of the embodiment that allows the user to interact with an attached device.

FIG. 13 shows a user holding the shadow box 100 attached to a cell phone such as an iPhone or Android or similar touch screen device, in which elastic bands 110A and 110B wrap around the cell phone and hold it securely to the attaching frame 106 (not seen in FIG. 13, see FIG. 14). FIG. 15 shows the device 100 having an aperture 112 in a bottom oriented horizontal panel 104B. FIG. 14 shows the device 100 attached to a cell phone showing a touch screen which is available to be operated by reaching through the aperture 112.

FIG. 16A shows the device 100 being held onto the screen of a recording device and in which the lens frame 108 has been folded upward by 270 degrees from its operating position. In this configuration, the device acts as a glare reducer, while the user looks through the device at the screen of the recording apparatus. FIG. 16B shows the same set up to a recording device except the lens frame 108 along with the lens L have been rotated into position so that the device now acts as a view finder.

In the foregoing descriptions the lens has been illustrated as a planar Fresnel type, however an optically shaped lens could be used, but with added bulk.

Following are descriptions of further embodiments of the invention. It will be appreciated that the invention continues to have the functions of glare reduction and viewfinder as well as the additional functions now described.

Further embodiments will enable the invention to function as a pocket foldable 3D and/or Virtual Reality viewer, that is, for viewing stereo imagery displayed on the image screen of an electronic image source device. This is implemented by incorporating into the box a two axis eye differentiating optical device at the viewing end. That basically means two lenses, spaced apart such that each eye views through one of the lenses. With such a device the apparatus and its method of use as described above can achieve 3D viewing of stereo imagery. This can be done by using a lens element comprising two separate lens such that the user can view one eye through each lens. The lenses can be simple lenses (sometimes generically called meniscus lenses or optically shaped) or planar Fresnel lenses. The lenses need to be of proper focal length for the distance to the image screen of the image source device.

These embodiments find particular application for modern cell phones which are somewhat larger than prior versions, having larger screens. These devices commonly have access to sources of virtual reality video (and audio) which can be saved and played or played as received.

In particular Apple iPhone development has increased screen size as do the GOOGLE Android products and Samsung Galaxy and Note products among many that are available. These and other units in the so-called "smartphone" category can be accommodated by increasing the overall size of the viewing device of the present invention to a size that would allow viewing to the larger screen of such products. In fact as larger screens are implemented such as in the category of tablets and pads and pods the present invention can be adapted to such larger screens by simply enlarging the device to provide the box size that will attach to and allow seeing the larger screen of such devices.

Virtual reality is said to be a complex, esoteric subject. Technically, virtual reality (VR) is the term used to describe a three-dimensional computer generated environment which can be explored and interacted with by a person. It is implemented in one way when a person wears a head-mounted display (HMD) or glasses which display three-dimensional images as part of the experience. The entire experience includes various sensory stimuli such as sound and video images which form the virtual reality environment. The head mounted display device takes the form of goggles of a helmet with a screen in front which displays three-dimensional images which can be seen in 3D through the goggles. The device can contain headphones and/or speakers or earbuds and the like for the audio portion. Such devices are expensive and have all the parts self contained in a single unit and of single use.

The present embodiment allows access to images on display on a screen of a multiuse device as detailed above Such a further embodiment of the present invention to provide for 3D and virtual reality viewing is illustrated in FIGS. 17A and 17B. For convenience, in part the numbering from FIGS. 12A and 12B are used here. In this new embodiment, the device 100 (also called the box) has as its primary parts spaced apart left and right vertical panels 102A and 102B and spaced apart upper and lower horizontal panels 104B and 104A. These panels are hinged together along their front to back edges thereby forming the box shape for the device in use and allowing it to be folded generally flat. At the front of the device, the attachment end, there is an attachment frame 106 adapted to have attached to it the electronic image source device 120 with its screen facing into the box. On the rear of the device, the viewing end, there is a viewing frame 108 in which are mounted a pair of lenses for viewing the screen in 3D. The attachment frame and the viewing frame are hinged, one to the upper horizontal panel and the other lower horizontal panel respectively, so that they too fold to provide the fully compact form. Preferably the viewing frame 108 is hinged to the lower horizontal panel 104A and the attachment frame 106 is hinged to the upper horizontal panel 104B.

It can be appreciated that this description is largely like that provided above. However, instead of a single lens L as in FIGS. 9, 14 and 16B, the lens element 110 of viewing frame 108, is a two axis eye differentiating optical device having lenses 114A and 114B shown in FIGS. 17A and 17B as a pair of simple lenses (sometimes called meniscus lenses or optical shaped lenses). These lenses are spaced apart the appropriate distance for creating 3D imagery, shown as the lens optical axis separation (OAS). That spacing is selected for human viewing based on interpupillary distance (IPD), the distance between the centers of the pupils of the two eyes. This distance may be in the range of about 62 to 65 mm, about 63 mm being an often selected average distance while 65 mm is often cited as the distance suitable for male adults. In addition, optionally, in order to prevent one eye from seeing both of the stereo images, a stereo separator wall 116 is in place extending centrally of the box length from the lens element 110 forward a selected distance, terminating at point 116A. While that distance does not have an exact measurement, it is considered that extending the stereo separator wall 116 from the lens element 110 at least about ¾ of the distance to, or all the way to the image screen of the image source device 120, will prevent inference with the stereo separating effect into each eye of the stereo imagery. Thus the stereo separator wall 116 will extend into the attachment frame so as to be close to the image screen when the image source device 120 is attached. For implementing the folding of the box 100, stereo separator wall 116 will be hinged either on the upper horizontal panel 104B or on the lower horizontal wall 104A. This can be an integral molded living hinge or a separate hinge. Also a detent bump and stop can be molded into the opposite horizontal panel to hold it in place vertically when ready for use (see FIG. 21).

The device 100 is equipped with a means for attaching an image source device 120 such as elastic bands 118 (see also FIG. 15). Other means for mounting the image source device 120 may be used such as a slidable insertion sleeve mounted on the attachment frame 106. Also, a hook and loop (sometimes herein called "hook and pile") fastening system can be implemented either coming with the equipment or mounted after market.

An alternative embodiment, while essentially similar to that in FIGS. 17A and 17B is shown in FIG. 18. That embodiment implements the lens element 110 with spaced apart planar Fresnel lenses 122a and 122b. They can be separate. Also, using planar Fresnel lenses will allow the lens element 110 to be made as one piece of transparent plastic with the two spaced apart planar Fresnel lenses integral to the one plastic strip. That is, there can be two Fresnel centers spaced apart on the same transparent support. These can be made as two separated impressed Fresnel lens focal centers on one piece of plastic. They can be fully independent or blended together on one piece of plastic. FIG. 19 shows a variation in which the Fresnel lenses 122A-1 and 122B-1 are spaced apart in order to place the optical axes the correct distance for good 3D viewing but are so large that. In such case a portion of each lens on the far left and far right is absent, this however allows for either or both, larger lenses and greater separation of the optical axes as might be needed without diminishing the optical effect desired. Of course, as desired, the dimensions of the box 100 can be increased to accommodate such arrangements of the lenses as well as to allow the use of larger screened image source devices.

FIG. 20 is a top view in which the stereo separator wall 116 can be seen extending centrally in the box 100, from proximate the lens attachment frame 108 to a selected end point 116A as described above, as illustrated nearly all the way to the forward edges of the horizontal panels. Also seen in FIG. 20 is the aperture 112 (also seen in FIGS. 14 and 15) through which the touch screen of the image source device 120 can be operated. Clip 117A on upper horizontal panel 104B and clip 117B on lower horizontal panel 104A are used to hold the viewing frame 108 and the attachment frame 106 in their folded out positions as will be described below.

FIG. 21 is view looking in from the viewing end and in which the lens attachment frame 108 is shown in its folded out position, held to the upper horizontal panel 104B by the clip 117A engaged onto slot 117C when the lens attachment frame is fully rotated into its folded out position. Similarly, the attachment frame has a slot 117D which will engage the clip 117B when the attachment frame is in the fully folded out position. In FIG. 21 the stereo separator wall 116 is seen located centrally of the interior so as to be evenly between the lenses, and hinged by a living hinge 115 at the top, located and held in place by a stop 111A and a detent 111B. Also indicated are exemplary dimensions, width (W) approximately 3⅝ inch and height (H) approximately 2 3/16 inches and the front-back measurement, SD as in FIG. 20, approximately 3½ inches for a particular embodiment.

FIG. 22 is a view from the side looking at the right vertical panel 102B with the viewing frame 108 and the attachment frame 106 each partially rotated toward their operating positions.

The viewing frame 108 and the attachment frame 106, when in the operating position fix the entire box into the rigidly held open position. In order to firmly keep this position retaining means are incorporated. One such retaining means is that the frames overlap the adjacent vertical panels and the horizontal panel on which each closes (the lower horizontal panel 104A for the viewing frame 108 and the upper horizontal panel 104B for the attaching frame 106. Another retaining means are a set of detent tabs 121A coupled with slots 121B. These are shown in FIGS. 20, 22 and the zoomed views of FIGS. 23A, 23B and 23C and the tabs 121A and slots 121B seen in the joined position in FIG. 17A. A third retaining means option is a set of positive lock clips 132 and posts 130 They are seen in FIG. 22 ready for their joinder when the rotation into operating position is complete, that being seen in FIGS. 17A. 18 and 20 in which the clips 132 are folded onto the posts 130 when the frame 106 is in position. These are shown with respect to the attachment frame 106 but work equally well when installed for use with the viewing frame 108.

FIG. 24 is a view looking in from the attachment end after the box 100 has been collapse into the storage or folded position, hinges in this figure being exemplary as living hinges integrally molded with both left and right side and top and bottom horizontal panels. Similarly the lens frame and the attachment frame are hinged (as seen in FIG. 22), also in the exemplary form as living hinges integrally molded. It is noted that the box can be constructed of separate panels with applied hinges and/or the lens frame and the attachment frame as well. Also shown in FIG. 22, the separator wall 116 is hinged at the center of the upper horizontal panel 104B. It could optionally be hinged on the upper horizontal panel 104B, and as with the other hinges can be an integral living hinge or a separately applied hinge. Also a detent retainer can be built into the panel opposite the hinge so that the stereo separator wall 116 can be "clicked" into position for use, and easily released for the folding step. This is shown in FIG. 21 as stop 11A and detent 111B.

FIG. 25 is a view looking from the side after the box has been collapsed, with the lens frame 108 on the top, in its folded out position, resting on the upper horizontal panel 102B and the attachment frame 106 on the bottom, in its folded out position, folded to rest on the bottom horizontal panel 102A. Each of the upper and bottom horizontal panels 102B and 102A, has the clip 117A and 117B respectively that extends and is received in the slot 117C and 117D in the respective lens frame 108 and attachment frame 106 respectively to hold them in the folded out position.

FIG. 26 shows the generic folding box 100 as described above equipped with a facial rest cushion 126 which allows for both comfort and blocking ambient light. FIG. 27 shows the same padding frame, but rendered removable in the exemplary case, by attaching hook and loop fasteners 128A and 128B to the facial rest cushion 126 and the lens frame 108 respectively.

When the viewing frame 108 is rotated out of the viewing position to allow direct viewing of the screen or when the device is folded for storage, the clip (shown in FIG. 15) extending from the lower horizontal panel 104A that fits into the slot in the viewing frame 108. Similarly, when in the folded position the attachment frame 106 is rotated and held by a clip on the upper horizontal panel 104B that extends into a slot.

The entire assembly of the box 100 and an image source device are shown in FIG. 28 being worn on a user's head by straps 134, 136 and also incorporating audio wiring 138.

Use of the device 100 typically can begin in the stored position as in FIGS. 24 and 25. It is rotated into the open position as seen in FIGS. 17A-21. As can be seen, the device can now be used. It accommodates several modes of use. As previously described, it can be used as a glare blocking device such as with the viewing frame folded out of the viewing position, and as a viewfinder device with the lens rotated into position. With the additional embodiments herein described with reference to FIGS. 17A-25, it can also be used for 3D or virtual reality viewing with a 3D or virtual reality image display device that provides a screen for viewing and has access to source such material.

Use as a head mounted virtual reality viewing device is illustrated in FIG. 28, the device 100 being retained on the user's head in viewing position by straps 134 and 1364. Also audio is heard through audio wiring 128.

SCOPE OF THE INVENTION

The above presents a description of the best mode I contemplate of carrying out my device and method and of the manner and process of making and using them, in such full, clear, concise, and exact terms as to enable any person skilled in the art to make and use my device and method. My device and method are, however, susceptible to modifications and alternate constructions from the illustrative embodiments discussed above which are fully equivalent. Consequently, it is not my intention to limit my device and method to the particular embodiments disclosed. On the contrary, my intention is to cover all modifications and alternate constructions coming within the spirit and scope of my device and method as generally expressed by the following claims, which particularly point out and distinctly claim the subject matter of my invention:

The invention claimed is:

1. A glare blocking viewfinder and virtual reality viewing device adapted to be detachably mounted on an image display device, said image display device being substantially flat and rectangular and having predetermined width and height dimensions and having an image display screen, said device comprising:
   a one-piece box portion having opposite sides panels and opposite horizontal panels defining a top panel and a bottom panel, the side panels being joined at adjoining edges to the top and bottom panels by hinges to form a box that can be in an open position and folded to a collapsed position and in the open position forming a rectangular opening at opposite ends, the openings defining an attachment end and a viewing end and further comprising an attaching frame at the attachment end attached by a hinge to one of the panels and a viewing frame at the viewing end attached by a hinge to a panel that is opposite to the one on which the attaching frame is hinged;
   a pair of spaced apart lenses mounted in or integral to the viewing frame;
   an attachment mechanism on the attaching frame for attaching the image display device with the image display screen being viewable through the lenses;
   whereby the device can be configured for use, as a viewfinder with the viewing frame and lenses in place over the viewing end and the attaching frame in place over the attaching end and as a glare reducing box with the viewing frame rotated up to 270 degrees into contact with the panel to which it is hinged and when viewing stereo imagery on an image display screen allowing 3 dimensional viewing and also having a storage configuration in which the box portion is collapsed and the attaching frame is folded into contact with the panel to which it is attached on one side of the folded box and the viewing frame and lenses are folded into contact with the panel to which it is attached on the other side of the folded box.

2. The device of claim 1 where the lenses have a magnifying power of 2× to 5×.

3. The device of claim 1 where the attachment mechanism comprises at least one elastic member extending across the attachment end.

4. The device of claim 1 where the attachment mechanism includes a magnet.

5. The device of claim 1 where the attachment mechanism comprises a hook and loop two-component fastener.

6. The device of claim 1 where the attachment mechanism comprises an open sleeve with opposed open sidewalls and opposed open ends, enabling the image display device to be inserted into the sleeve through one end and images thereon to be viewed through the device.

7. The device of claim 1 having a width dimension where the width dimension is sufficient to accommodate both eyes of a user viewing the image display screen at the same time.

8. The device of claim 7 where the width dimension is substantially from 3.5 to 5 inches.

9. The device of claim 1 wherein at least the box portion is one piece of molded plastic and the hinges are living hinges.

10. The device of claim 9 wherein the attaching frame and the viewing frame are also part of the one piece of molded plastic and are attached by living hinges.

11. The device of claim 1 wherein the two lenses each have an optical axis which define a spacing of the lenses and which are substantially parallel and substantially orthogonal to an image screen of an image display device attached to the attachment end.

12. The device of claim 1 wherein the two lenses are optical lenses.

13. The device of claim 1 wherein the two lenses are Fresnel lenses.

14. A combination of a virtual reality viewing device detachably mounted on an image display device, said image display device being substantially flat and rectangular and having predetermined width and height dimensions and having an image display screen, said device comprising:
   a one-piece box portion having opposite sides panels and opposite horizontal panels defining a top panel and a bottom panel, the side panels being joined at adjoining edges to the top and bottom panels by hinges to form a box that can be in an open position and folded to a collapsed position and in the open position forming a box shape with rectangular opening at opposite ends, the openings defining an attachment end and a viewing end and further comprising an attaching frame at the attachment end attached by a hinge to one of the panels and a viewing frame at the viewing end attached by a hinge to a panel that is opposite to the one on which the attaching frame is hinged;

a pair of spaced apart lenses mounted in or integral to the viewing frame;

an attachment mechanism on the attaching frame for attaching the image display device with the image display screen being viewable through the lenses;

whereby the device can be configured for use when viewing stereo imagery on an image display screen allowing 3 dimensional viewing through the lenses and also having a storage configuration in which the box portion is collapsed and the attaching frame is folded into contact with the panel to which it is attached on one side of the folded box and the viewing frame and lenses are folded into contact with the panel to which it is attached on the other side of the folded box.

15. The device of claim 14 wherein the image display device is of hand held type able to receive imagery by one or more of wi-fi or internet or telephony connection.

16. The device of claim 14 wherein the two lenses each have an optical axis which define a spacing of the lenses and which are substantially parallel and substantially orthogonal to the image screen of the image display device.

17. The device of claim 14 wherein the two lenses are optical lenses.

18. The device of claim 14 wherein the two lenses are Fresnel lenses.

19. The device of claim 14 further comprising a stereo separator wall extending from proximate the viewing end toward the attachment end and terminating a distance range of approximately at least ¾ of the distance to the viewing end to all the way to the viewing end.

20. The device of claim 14 further comprising retaining means for retaining the device in the box shape.

21. The device of claim 14 further comprising retaining means at the attachment end to retain the attaching frame in position when the image display device is in place.

* * * * *